US009336648B2

(12) United States Patent
Baerlocher et al.

(10) Patent No.: US 9,336,648 B2
(45) Date of Patent: May 10, 2016

(54) GAMING SYSTEM AND METHOD FOR PROVIDING SYMBOL COMBINATIONS WITH DYNAMIC AWARDS

(75) Inventors: Anthony J. Baerlocher, Reno, NV (US); Daniel J. DeWaal, Las Vegas, NV (US); Cameron A. Filipour, Las Vegas, NV (US); Kevan Wilkins, Las Vegas, NV (US)

(73) Assignee: IGT, Las Vegas, NV (US)

( * ) Notice: Subject to any disclaimer, the term of this patent is extended or adjusted under 35 U.S.C. 154(b) by 1320 days.

(21) Appl. No.: 12/616,445

(22) Filed: Nov. 11, 2009

(65) Prior Publication Data

US 2011/0111826 A1 May 12, 2011

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |
| ***G07F 17/34*** | (2006.01) |

(52) U.S. Cl.
CPC ........ *G07F 17/3244* (2013.01); *G07F 17/3258* (2013.01); *G07F 17/34* (2013.01)

(58) Field of Classification Search
CPC .. G07F 17/34; G07F 17/3244; G07F 17/3258
USPC .............................. 463/16, 20, 25, 27, 29, 42
See application file for complete search history.

(56) References Cited

U.S. PATENT DOCUMENTS 5,116,055 A 5/1992 Tracy
5,280,909 A 1/1994 Tracy
5,344,144 A 9/1994 Canon
(Continued)

FOREIGN PATENT DOCUMENTS

DE 3915655 11/1990
GB 2 098 778 11/1982
WO WO 00/32286 6/2000

OTHER PUBLICATIONS

Letter from Marvin A. Motsenbocker of Mots Law dated Jul. 8, 2011 regarding Third Party Submission in Published Application Under 37 C.F.R. 1.99 filed for U.S. Appl. No. 12/616,445 (1 page).
(Continued)

*Primary Examiner* — Omkar Deodhar
*Assistant Examiner* — Wei Lee
(74) *Attorney, Agent, or Firm* — Neal, Gerber & Eisenberg LLP

(57) ABSTRACT

The gaming system and method disclosed herein provides a plurality of symbol combinations that are each associated with a dynamic award. Such dynamic awards increase based, at least in part, on one or more random events which occur in association with one or more plays of a game. In one embodiment, the gaming system increases the dynamic award of a designated symbol combination based on the random generation of another, different symbol combination. In this embodiment, if the gaming system randomly generates the other symbol combination, the gaming system: (i) provides any award associated with this other symbol combination, and (ii) increases the dynamic award of the designated symbol combination. Additionally, if the gaming system randomly generates the designated symbol combination, the gaming system provides to a player the dynamic award of the designated symbol combination.

21 Claims, 15 Drawing Sheets

(56) References Cited

U.S. PATENT DOCUMENTS

| | | | | |
|---|---|---|---|---|
| 5,364,104 | A | 11/1994 | Jones et al. | |
| 5,377,973 | A | 1/1995 | Jones et al. | |
| 5,564,700 | A | 10/1996 | Celona | |
| 5,611,730 | A | 3/1997 | Weiss | |
| 5,655,961 | A | 8/1997 | Acres et al. | |
| 5,766,076 | A | 6/1998 | Pease et al. | |
| 5,855,515 | A | 1/1999 | Pease et al. | |
| 5,885,158 | A | 3/1999 | Torango et al. | |
| 6,062,981 | A | 5/2000 | Luciano, Jr. | |
| 6,068,552 | A | 5/2000 | Walker et al. | |
| 6,110,043 | A | 8/2000 | Olsen | |
| 6,146,273 | A | 11/2000 | Olsen | |
| 6,159,098 | A | 12/2000 | Slomiany et al. | |
| 6,162,121 | A | 12/2000 | Morro et al. | |
| 6,203,430 | B1 | 3/2001 | Walker et al. | |
| 6,210,275 | B1 | 4/2001 | Olsen | |
| 6,217,448 | B1 | 4/2001 | Olsen | |
| 6,231,445 | B1 | 5/2001 | Acres | |
| 6,290,603 | B1 | 9/2001 | Luciano, Jr. | |
| 6,312,334 | B1 | 11/2001 | Yoseloff | |
| 6,319,125 | B1 | 11/2001 | Acres | |
| 6,328,649 | B1 * | 12/2001 | Randall et al. | 463/20 |
| 6,435,511 | B1 | 8/2002 | Vancura et al. | |
| RE37,885 | E | 10/2002 | Acres et al. | |
| 6,468,156 | B1 | 10/2002 | Hughs-Baird et al. | |
| 6,565,434 | B1 | 5/2003 | Acres | |
| 6,569,013 | B1 | 5/2003 | Taylor | |
| 6,599,193 | B2 | 7/2003 | Baerlocher et al. | |
| 6,663,487 | B1 | 12/2003 | Ladner | |
| 6,712,693 | B1 | 3/2004 | Hettinger | |
| 6,746,016 | B2 | 6/2004 | Perrie et al. | |
| 6,802,778 | B1 | 10/2004 | Lemay et al. | |
| RE38,812 | E | 10/2005 | Acres et al. | |
| 6,966,834 | B1 | 11/2005 | Johnson | |
| 7,056,215 | B1 | 6/2006 | Olive | |
| 7,070,505 | B2 | 7/2006 | Vancura et al. | |
| 7,198,569 | B2 | 4/2007 | Wolf et al. | |
| 7,297,059 | B2 | 11/2007 | Vancura et al. | |
| 7,357,716 | B2 | 4/2008 | Marks et al. | |
| 7,360,764 | B2 | 4/2008 | Vancura et al. | |
| 7,419,162 | B2 | 9/2008 | Lancaster et al. | |
| 7,470,184 | B2 | 12/2008 | Baerlocher et al. | |
| 8,784,188 | B2 | 7/2014 | Walker et al. | |
| 2002/0006822 | A1 * | 1/2002 | Krintzman | 463/27 |
| 2002/0151354 | A1 | 10/2002 | Boesen et al. | |
| 2003/0224852 | A1 * | 12/2003 | Walker et al. | 463/20 |
| 2004/0023713 | A1 | 2/2004 | Wolf et al. | |
| 2004/0038724 | A1 | 2/2004 | Asdale | |
| 2004/0048644 | A1 | 3/2004 | Gerrard et al. | |
| 2004/0087359 | A1 * | 5/2004 | Cuddy et al. | 463/20 |
| 2004/0171416 | A1 | 9/2004 | Baerlocher et al. | |
| 2004/0204235 | A1 * | 10/2004 | Walker et al. | 463/29 |
| 2004/0242313 | A1 | 12/2004 | Munoz | |
| 2005/0192086 | A1 | 9/2005 | Walker et al. | |
| 2005/0208992 | A1 | 9/2005 | Randall | |
| 2005/0239542 | A1 | 10/2005 | Olsen | |
| 2006/0025195 | A1 | 2/2006 | Pennington et al. | |
| 2006/0030403 | A1 | 2/2006 | Lafky et al. | |
| 2006/0178203 | A1 | 8/2006 | Hughes et al. | |
| 2006/0183535 | A1 | 8/2006 | Marks et al. | |
| 2007/0054733 | A1 | 3/2007 | Baerlocher | |
| 2007/0060271 | A1 | 3/2007 | Cregan et al. | |
| 2007/0060321 | A1 | 3/2007 | Vasquez et al. | |
| 2007/0117610 | A1 | 5/2007 | Webb et al. | |
| 2007/0135207 | A1 | 6/2007 | Tarantino | |
| 2007/0155483 | A1 | 7/2007 | Walker et al. | |
| 2007/0184887 | A1 | 8/2007 | Cannon | |
| 2007/0202943 | A1 | 8/2007 | Thomas | |
| 2007/0218982 | A1 | 9/2007 | Baerlocher | |
| 2007/0287532 | A1 | 12/2007 | Jackson | |
| 2007/0298875 | A1 | 12/2007 | Baerlocher et al. | |
| 2008/0039191 | A1 | 2/2008 | Cuddy | |
| 2008/0076503 | A1 | 3/2008 | Mattice et al. | |
| 2008/0085770 | A1 | 4/2008 | Morgan | |
| 2008/0090651 | A1 | 4/2008 | Baerlocher | |
| 2008/0108410 | A1 | 5/2008 | Baerlocher | |
| 2008/0108423 | A1 | 5/2008 | Benbrahim et al. | |
| 2008/0108430 | A1 | 5/2008 | Evans | |
| 2008/0108431 | A1 | 5/2008 | Cuddy et al. | |
| 2008/0113779 | A1 | 5/2008 | Cregan | |
| 2008/0132324 | A1 | 6/2008 | Toyoda | |
| 2008/0274790 | A1 | 11/2008 | Cannon | |
| 2009/0017900 | A1 * | 1/2009 | Fujimoto et al. | 463/20 |
| 2009/0036202 | A1 | 2/2009 | Baerlocher et al. | |
| 2009/0042645 | A1 | 2/2009 | Graham et al. | |
| 2009/0042652 | A1 | 2/2009 | Baerlocher et al. | |
| 2009/0088239 | A1 | 4/2009 | Iddings et al. | |
| 2009/0088244 | A1 | 4/2009 | Nicely et al. | |
| 2009/0111561 | A1 | 4/2009 | Dewaal et al. | |
| 2009/0124316 | A1 | 5/2009 | Baerlocher et al. | |
| 2009/0124362 | A1 | 5/2009 | Cuddy et al. | |
| 2009/0124363 | A1 | 5/2009 | Baerlocher et al. | |
| 2009/0124364 | A1 | 5/2009 | Cuddy et al. | |
| 2010/0261524 | A1 * | 10/2010 | Pawloski et al. | 463/27 |

OTHER PUBLICATIONS

Third Party Submission in Published Application Under 37 C.F.R. 1.99 filed for U.S. Appl. No. 12/616,445, dated Jul. 8, 2011 (3 pages).

* cited by examiner

FIG. 4A

| | | |
|---|---|---|
| JP - Jackpot symbol | 3B - 3 Bars symbol | 1B - 1 Bar symbol |
| R7 - Red 7 symbol | PL - Plums symbol | AB - Any Bar symbol |
| B7 - Blue 7 symbol | 2B - 2 Bars symbol | AF - Any Fruit symbol |
| ME - Melons symbol | OR - Oranges symbol | -- - Blank |
| A7 - Any 7 symbol | | |

| Symbol Combination | Probability of Symbol Combination being Generated | Reset of Dynamic Award | Predefined Increment Amount | Associated Target Symbol Combination | Contribution of Reset of Dynamic Award Associated with Target Symbol Combination | Contribution of Increment |
|---|---|---|---|---|---|---|
| **Winning Symbol Combinations** | | | | | | |
| JP JP JP | 0.033% | 100 | 0 | None | 3.30% | 0.00% |
| R7 R7 R7 | 0.113% | 50 | 20 | JP JP JP | 5.66% | 2.27% |
| B7 B7 B7 | 0.010% | 40 | 50 | R7 R7 R7 | 0.40% | 0.50% |
| ME ME ME | 0.074% | 30 | 10 | B7 B7 B7 | 2.23% | 0.74% |
| A7 A7 A7 | 0.220% | 25 | 10 | ME ME ME | 5.50% | 2.20% |
| 3B 3B 3B | 0.058% | 15 | 25 | A7 A7 A7 | 0.88% | 1.46% |
| PL PL PL | 0.112% | 10 | 10 | 3B 3B 3B | 1.12% | 1.12% |
| 2B 2B 2B | 0.086% | 10 | 8 | PL PL PL | 0.86% | 0.69% |
| OR OR OR | 0.080% | 5 | 10 | 2B 2B 2B | 0.40% | 0.80% |
| 1B 1B 1B | 0.263% | 5 | 5 | OR OR OR | 1.31% | 1.31% |
| AB AB AB | 3.143% | 2 | 2 | 1B 1B 1B | 6.29% | 6.29% |
| AF AF AF | 2.195% | 1 | 3 | AB AB AB | 2.20% | 6.59% |
| TOTAL: | 6.388% | | | TOTAL: | 30.15% | |
| **Non-Winning Symbol Combinations** | | | | | | |
| -- -- -- | 0.342% | 0 | 4 | JP JP JP | | 1.37% |
| | | | 2 | R7 R7 R7 | | 0.68% |
| | | | 2 | B7 B7 B7 | | 0.68% |
| | | | 2 | A7 A7 A7 | | 0.68% |
| | | | 1 | AB AB AB | | 0.34% |
| | | | 1 | AF AF AF | | 0.34% |
| AF AB A7 | 1.511% | 0 | 1 | ME ME ME | | 1.51% |
| | | | 1 | AF AF AF | | 1.51% |
| AF A7 AB | 2.521% | 0 | 1 | AF AF AF | | 2.52% |
| | | | 1 | AB AB AB | | 2.52% |
| AB AF A7 | 0.851% | 0 | 1 | AB AB AB | | 0.85% |

FIG. 4B

| | | | | | | |
|---|---|---|---|---|---|---|
| AB A7 AF | 1.588% | 0 | 1 | 3B 3B 3B | | 1.59% |
| A7 AF AB | 1.251% | 0 | 1 | A7 A7 A7 | | 1.25% |
| A7 AB AF | 1.397% | 0 | 1 | R7 R7 R7 | | 1.40% |
| A7 AB - - | 0.793% | 0 | 2 | JP JP JP | | 1.59% |
| | | | 2 | A7 A7 A7 | | 1.59% |
| A7 AF - - | 0.559% | 0 | 1 | B7 B7 B7 | | 0.56% |
| AB A7 - - | 0.901% | 0 | 1 | 2B 2B 2B | | 0.90% |
| | | | 1 | AB AB AB | | 0.90% |
| AB AF - - | 1.118% | 0 | 1 | 1B 1B 1B | | 1.12% |
| AF AB - - | 1.983% | 0 | 1 | PL PL PL | | 1.98% |
| | | | 1 | AB AB AB | | 1.98% |
| AF A7 - - | 1.127% | 0 | 1 | OR OR OR | | 1.13% |
| A7 A7 - - | 0.451% | 0 | 1 | A7 A7 A7 | | 0.45% |
| | | | 1 | R7 R7 R7 | | 0.45% |
| | | | 1 | B7 B7 B7 | | 0.45% |
| AB AB - - | 1.586% | 0 | 1 | AB AB AB | | 1.59% |
| AF AF - - | 1.397% | 0 | 1 | AF AF AF | | 1.40% |
| - - A7 A7 | 0.343% | 0 | 1 | A7 A7 A7 | | 0.34% |
| | | | 1 | R7 R7 R7 | | 0.34% |
| | | | 1 | B7 B7 B7 | | 0.34% |
| - - AB AB | 1.775% | 0 | 1 | AB AB AB | | 1.77% |
| - - AF AF | 0.984% | 0 | 1 | AF AF AF | | 0.98% |
| A7 - - A7 | 0.261% | 0 | 1 | A7 A7 A7 | | 0.26% |
| | | | 1 | R7 R7 R7 | | 0.26% |
| | | | 1 | B7 B7 B7 | | 0.26% |
| AB - - AB | 1.533% | 0 | 1 | AB AB AB | | 1.53% |
| AF - - AF | 1.508% | 0 | 1 | AF AF AF | | 1.51% |
| TOTAL: | 25.780% | | | | TOTAL: | 64.91% |
| Action Frequency | TOTAL: 32.168% | | | | | |

FIG. 5A

| Symbol Combination | Reset | Target Symbol Combination | Dynamic Award Component |
|---|---|---|---|
| JP JP JP | 100 | None | |
| R7 R7 R7 | 50 | JP JP JP | |
| B7 B7 B7 | 40 | R7 R7 R7 | |
| ME ME ME | 30 | B7 B7 B7 | |
| A7 A7 A7 | 25 | ME ME ME | |
| 3B 3B 3B | 15 | A7 A7 A7 | |
| PL PL PL | 10 | 3B 3B 3B | |
| | | | |
| Non winning | 0 | JP JP JP | |

FIG. 5B

| Symbol Combination | Reset | Target Symbol Combination | Dynamic Award Component |
|---|---|---|---|
| JP JP JP | 100 | None | |
| R7 R7 R7 | 50 | JP JP JP | |
| B7 B7 B7 | 40 | R7 R7 R7 | |
| ME ME ME | 30 | B7 B7 B7 | |
| A7 A7 A7 | 25 | ME ME ME | |
| 3B 3B 3B | 15 | A7 A7 A7 | |
| PL PL PL | 10 | 3B 3B 3B | |
| | | | |
| Non winning | 0 | JP JP JP | |

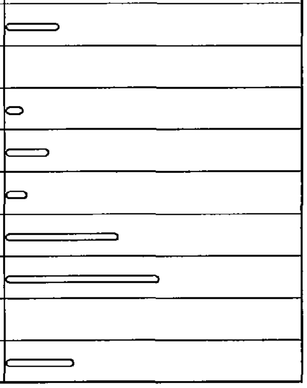

FIG. 5C

| Symbol Combination | Reset | Target Symbol Combination | Dynamic Award Component |
|---|---|---|---|
| JP JP JP | 100 | None | |
| R7 R7 R7 | 50 | JP JP JP | |
| B7 B7 B7 | 40 | R7 R7 R7 | |
| ME ME ME | 30 | B7 B7 B7 | |
| A7 A7 A7 | 25 | ME ME ME | |
| 3B 3B 3B | 15 | A7 A7 A7 | |
| PL PL PL | 10 | 3B 3B 3B | |
| | | | |
| Non winning | 0 | JP JP JP | |

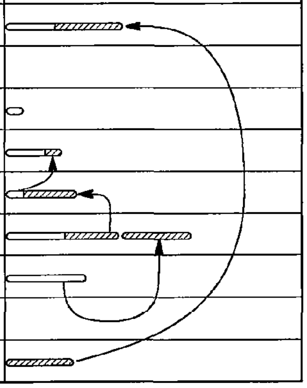

FIG. 6A 16,18

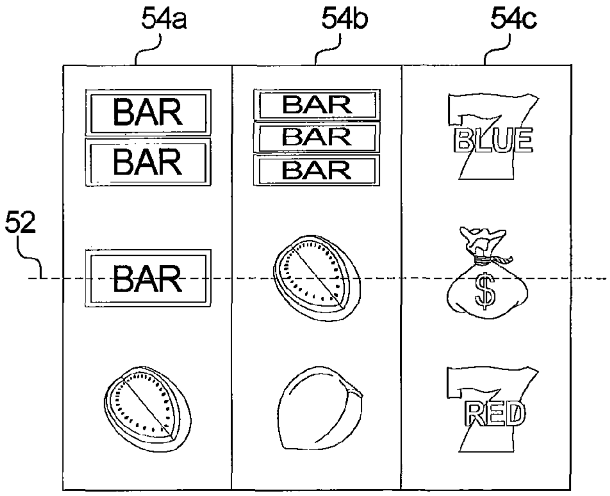

Please place a wager to generate
a symbol combination.
Good luck!

152a 152b

150

| Symbol Combination | Award Prior to Symbol Generation |
|---|---|
| Three Jackpot Symbols | 100 |
| Three Red Seven Symbols | 50 |
| Three Blue Seven Symbols | 40 |
| Three Melon Symbols | 30 |
| Any Three Seven Symbols | 25 |
| Three 3 Bar Symbols | 15 |
| Three Plum Symbols | 10 |
| Three 2 Bar Symbols | 10 |
| Three Orange Symbols | 5 |
| Three 1 Bar Symbols | 5 |
| Any Three Bar Symbols | 2 |
| Any Three Fruit Symbols | 1 |

Award 154 0

FIG. 6B 16,18

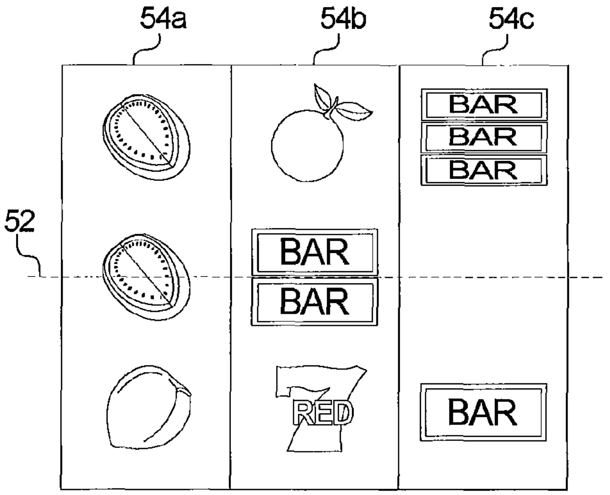

You generated a losing symbol combination. However, your generated losing symbol combination caused the award for the winning three plum symbol combination to increase by one credit to eleven credits. Your generated losing symbol combination also caused the award for any three bar symbols to increase by one credit to three credits.

152a 152b 152c

150

| Symbol Combination | Award Prior to Symbol Generation | Award After Symbol Generation |
|---|---|---|
| Three Jackpot Symbols | 100 | 100 |
| Three Red Seven Symbols | 50 | 50 |
| Three Blue Seven Symbols | 40 | 40 |
| Three Melon Symbols | 30 | 30 |
| Any Three Seven Symbols | 25 | 25 |
| Three 3 Bar Symbols | 15 | 15 |
| Three Plum Symbols | 10 | 11 |
| Three 2 Bar Symbols | 10 | 10 |
| Three Orange Symbols | 5 | 5 |
| Three 1 Bar Symbols | 5 | 5 |
| Any Three Bar Symbols | 2 | 3 |
| Any Three Fruit Symbols | 1 | 1 |

Award 154 0

FIG. 6C 16,18

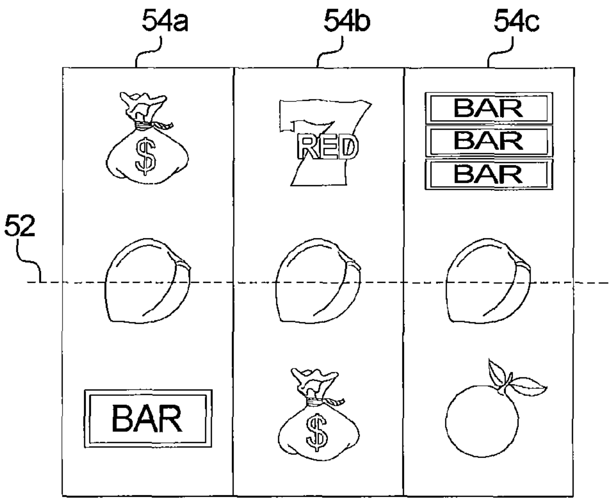

You generated a winning symbol combination of three plum symbols. You win 11 credits for the three plum symbol combination. The three plum symbol combination will now reset to 10 credits. The three plum symbol combination also caused the award for the three 3 bar symbol combination to increase by 10 credits to 25 credits.

152a 152b 152c

150

| Symbol Combination | Award Prior to Symbol Generation | Award After Symbol Generation |
|---|---|---|
| Three Jackpot Symbols | 100 | 100 |
| Three Red Seven Symbols | 50 | 50 |
| Three Blue Seven Symbols | 40 | 40 |
| Three Melon Symbols | 30 | 30 |
| Any Three Seven Symbols | 25 | 25 |
| Three 3 Bar Symbols | 15 | 25 |
| Three Plum Symbols | 11 | 10 |
| Three 2 Bar Symbols | 10 | 10 |
| Three Orange Symbols | 5 | 5 |
| Three 1 Bar Symbols | 5 | 5 |
| Any Three Bar Symbols | 3 | 3 |
| Any Three Fruit Symbols | 1 | 1 |

Award 154 11

FIG. 6D 16,18

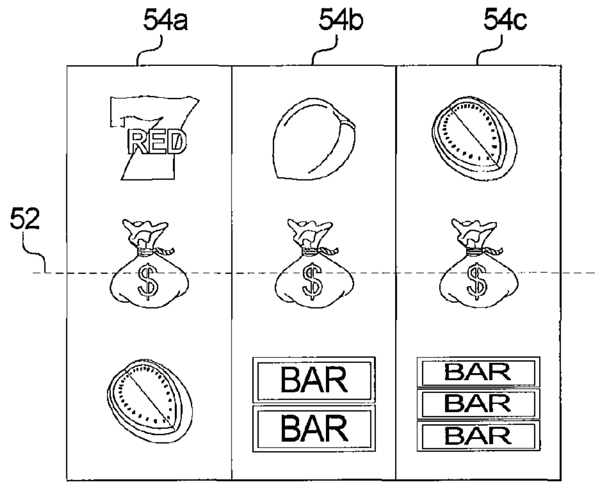

You generated a winning symbol combination of three jackpot symbols. You win 167 credits for the three jackpot symbol combination. The three jackpot symbol combination will now reset to 100 credits.

150

| Symbol Combination (152a) | Award Prior to Symbol Generation (152b) | Award After Symbol Generation (152c) |
|---|---|---|
| Three Jackpot Symbols | 167 | 100 |
| Three Red Seven Symbols | 56 | 56 |
| Three Blue Seven Symbols | 55 | 55 |
| Three Melon Symbols | 30 | 30 |
| Any Three Seven Symbols | 36 | 36 |
| Three 3 Bar Symbols | 27 | 27 |
| Three Plum Symbols | 17 | 17 |
| Three 2 Bar Symbols | 29 | 29 |
| Three Orange Symbols | 16 | 16 |
| Three 1 Bar Symbols | 12 | 12 |
| Any Three Bar Symbols | 2 | 2 |
| Any Three Fruit Symbols | 1 | 1 |

Award 154 167

FIG. 8
| Symbol Combination | Award | Reset Funding |
|---|---|---|
|  | Dynamic | 5% |
|  | Dynamic | 4% |
|  | Dynamic | 3% |
|  | Dynamic | |
|  | Dynamic | |

GAMING SYSTEM AND METHOD FOR PROVIDING SYMBOL COMBINATIONS WITH DYNAMIC AWARDS

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and based on the amount of the wager (e.g., the higher the wager, the higher the award). Symbols or symbol combinations which are less likely to occur usually provide higher awards.

In such known gaming machines, the amount of the wager made on the base game by the player may vary. For instance, the gaming machine may enable the player to wager a minimum number of credits, such as one credit (e.g., one cent, nickel, dime, quarter or dollar) up to a maximum number of credits, such as five credits. This wager may be made by the player a single time or multiple times in a single play of a primary game. For instance, a slot game may have one or more paylines and the slot game may enable the player to make a wager on each payline in a single play of the primary game. Slot games with 1, 3, 5, 9, 15 and 25 paylines are widely commercially available. Thus, it is known that a gaming machine, such as a slot game, may enable players to make wagers of substantially different amounts on each play of the primary or base game ranging, for example, from one credit up to 125 credits (e.g., five credits on each of 25 separate paylines). This is also true for other wagering games, such as video draw poker, where players can wager one or more credits on each hand and where multiple hands can be played simultaneously.

In certain known gaming machines, the player wagers on a player selected number or combination of paylines. Following the wager, a plurality of reels are activated to spin to generate a plurality of symbols. After the reels spin, the gaming machine analyzes the generated symbols to determine, according to an applicable paytable, if a winning symbol or winning symbol combination is randomly generated on one or more of the wagered on paylines. If the gaming machine determines that a winning symbol or winning symbol combination is randomly generated on a wagered on payline, the gaming machine determines, according to the applicable paytable, an award value for the randomly generated winning symbol or winning symbol combination. The gaming machine then determines a payline award by multiplying the award value for the winning symbol or winning symbol combination by the amount wagered on the payline upon which the winning symbol or winning symbol combination was generated.

These known gaming machines are typically set to pay back, on average, a certain percentage of the amounts wagered by players at that gaming machine. The average percentage wagered that is provided back to players as awards is often referred to as the average expected payback percentage. The average expected payback percentage provided by such gaming machines is determined by the applicable paytable of the gaming machine. In these gaming machines, the paytable (including the winning symbol combinations and the awards associated with such winning symbol combinations) is static or otherwise predetermined. Thus, although the actual payback percentage may vary throughout game play, the average expected payback percentage for a gaming machine is predetermined and remains constant throughout game play. Accordingly, to increase player enjoyment and excitement, a need exists to provide new gaming machines which vary award returns and risk.

Progressive awards associated with gaming machines are also known. In one form, a progressive award is an award amount which includes an initial amount funded by a casino and an additional amount funded through a portion of each wager made on the progressive gaming machine. For example, 0.1% of each wager placed on the primary game of the gaming machine associated with the progressive award may be allocated to the progressive award or progressive award fund or pool. Such wager based funding of the progressive award fund or pool provides that these progressive awards are non-result driven awards. The progressive award grows in value as more players play the gaming machines and more portions of these players' wagers are allocated to the progressive award. When a player obtains a winning symbol or symbol combination associated with the progressive award, the accumulated progressive award is provided to the player. After the progressive award is provided to the player, the amount of the next progressive award is reset to the initial value and a portion of each subsequent wager on a gaming machine associated with a progressive award is allocated to the next progressive award.

A progressive award may be associated with or otherwise dedicated to a single or stand-alone gaming machine. Alternatively, a progressive award may be associated with or otherwise dedicated to multiple gaming machines which each contribute a portion of wagers placed at such gaming machine(s) to the progressive award. The multiple gaming machines may be in the same bank of gaming machines, in the same casino or gaming establishment (usually through a local area network ("LAN")) or in two or more different casinos or gaming establishments (usually through a wide area network ("WAN")). Such progressive awards are played for by one or more gaming devices in the same gaming establishment sometimes called local area progressives ("LAP") and such progressive awards played for by a plurality of gaming devices at a plurality of different gaming establishments are sometimes called wide area progressives ("WAP").

Moreover, a gaming machine or bank of gaming machines may be simultaneously associated with a plurality of progressive awards. In these multi-level progressive ("MLP") configurations, a plurality of progressive awards start at different award or value levels, such as $10, $100, $1000 and $10,000 and each individually increment or increase until provided to a player. Upon a suitable triggering event at one of more of the gaming devices associated with the MLP, one or more of the progressive awards which form the MLP are provided to one or more of the players at such gaming devices.

While such progressive awards are popular amongst players, a number of problems exist with these known progressive award systems. First, only one person wins the progressive award. This may discourage the other players who have also been playing for a long period of time. Such discouragement can lead to players walking away with jackpot fatigue. Jackpot fatigue can occur when a player no longer finds an award desirable or worth the cost of continuing to play. This desire to quit playing is also due to the fact that a player may feel they must wait a substantial period of time for the jackpot to climb back to a high value. That is, when a progressive award is provided at a different gaming machine, a player may feel deflated and not wish to continue playing for a base or reset level progressive award. Additionally, because the mathematics and funding required to maintain the progressive awards at levels desirable to the player, such progressive awards are often won or hit infrequently.

There is a continuing need to provide new and different gaming machines and gaming systems as well as new and different ways to provide awards to players including bonus awards.

SUMMARY

In various embodiments, the gaming system and method disclosed herein provides a plurality of symbol combinations that are each associated with one of a plurality of dynamic awards. Such dynamic awards increment or increase based, at least in part, on one or more random events which occur in association with one or more plays of a game. In one embodiment, the gaming system increases the dynamic award for a designated symbol combination based on the random generation of another, different symbol combination. In this embodiment, if the gaming system randomly generates the other symbol combination, the gaming system: (i) provides any award associated with this other symbol combination, and (ii) increases the dynamic award of the designated symbol combination. Additionally, if the gaming system randomly generates the designated symbol combination, the gaming system provides to a player the dynamic award of the designated symbol combination. Accordingly, the more frequently the gaming system generates this other symbol combination, the more frequently the gaming system increases the dynamic award of the designated symbol combination. This embodiment thus provides that if the designated symbol combination is randomly generated, the dynamic award provided is based, at least in part, on a quantity of times the other symbol combination (which is associated with the designated symbol combination) was randomly generated. Such a configuration provides a gaming system with increased volatility and thus a gaming system with increased player excitement and enjoyment.

In one embodiment, the gaming system maintains a paytable including a plurality of different symbol combinations. A plurality of the symbol combinations of the maintained paytable are target symbol combinations. Each target symbol combination is associated with a dynamic award amount. In this embodiment, a plurality of the symbol combinations of the maintained paytable are incrementor symbol combinations. Each incrementor symbol combination is associated with a predefined increment amount and one of the target symbol combinations. For example, the gaming system maintains a paytable including a target symbol combination of three apple symbols and a incrementor symbol combination of three orange symbols. The three apple symbol combination (i.e., the target symbol combination) is associated with a dynamic award having an initial value of one-hundred credits. The three orange symbol combination (i.e., the incrementor symbol combination) is associated with the three apple symbol combination, an award of five credits and a predefined increment amount of ten credits.

In operation of this embodiment, the gaming system randomly generates one of the plurality of symbol combinations of the maintained paytable. If the gaming system randomly generates one of the incrementor symbol combinations, the gaming system: (i) provides any award associated with the incrementor symbol combination, and (ii) increases the dynamic award of the non-generated target symbol combination associated with the generated incrementor symbol combination. The dynamic award of the target symbol combination is increased by the predefined increment amount of the associated incrementor symbol combination. If the gaming system randomly generates the target symbol combination, the gaming system provides a player the dynamic award of the generated target symbol combination and resets the provided dynamic award. Following the above example, if the gaming system randomly generates the three orange symbol combination (i.e., the incrementor symbol combination), the gaming system: (i) provides a player the five credits award associated with the three orange symbol combination, and (ii) increases the dynamic award of the non-generated three apple symbol combination (i.e., the target symbol combination) by the predefined increment amount of ten credits (such that the dynamic award of the three apple symbol combination has a current value of one-hundred-ten credits). In this example, if the gaming system randomly generates the three apple symbol combination, the gaming system provides the current value of the dynamic award of the generated three apple symbol combination and resets the value of this dynamic award. It should be appreciated that the current value of the dynamic award provided to a player for the generation of a target symbol combination is based on if any incrementor symbol combinations associated with that target symbol combination have been generated and the quantity of times such incrementor symbol combinations have been generated. Accordingly, the dynamic award provided to a player may be based on: (i) the random generation of the target symbol combination associated with the provided dynamic award, and (ii) one or more random generations of one or more incrementor symbol combinations associated with that target symbol combination.

In one embodiment, a plurality of the symbol combinations of the paytable of the gaming system disclosed herein each function both as a target symbol combination and as an incrementor symbol combination. In this embodiment, if the gaming system randomly generates such a symbol combination, the gaming system provides to a player part or all of the dynamic award amount associated with that symbol combination and also increments the dynamic award amount of another symbol combination (which is associated with the generated symbol combination) by the increment amount of the generated symbol combination. For example, the three apple symbol combination functions both as a target symbol combination (with respect to the three orange symbol combination) and as an incrementor symbol combination having a predefined increment amount of twenty credits (with respect to a three banana symbol combination). In this example, if the gaming system randomly generates this three apple symbol combination, the gaming system: (i) provides the current value of the dynamic award of the generated three apple symbol combination, (ii) resets the provided dynamic award of the generated three apple symbol combination, and (iii) increases the dynamic award of the non-generated three banana symbol combination by the increment amount of twenty credits. Accordingly, the gaming system disclosed herein includes a plurality of the symbol combinations classified as action symbol combinations which when generated, cause the gaming system to: (i) increase the dynamic award of another symbol combination (i.e., incrementor symbol combinations), (ii) provide the current value of the dynamic award of the generated symbol combination and reset the dynamic award (i.e., target symbol combinations), or (iii) increase the dynamic award of another symbol combination, provide the current value of the dynamic award of the generated symbol combination and reset the dynamic award (i.e., incrementor/target symbol combinations).

In one embodiment illustrating a multi-gaming device aspect of the present disclosure, the gaming system disclosed herein provides that the occurrence of a random generation at one gaming device affects the award available to be provided to a player at another gaming device. In one such embodiment, if a first gaming device in the gaming system randomly generates an incrementor symbol combination, then the dynamic award of the target symbol combination associated with that incrementor symbol combination is increased for each of the gaming devices in the gaming system. In this embodiment, if a different, second gaming device in the gaming system subsequently randomly generates the target symbol combination associated with that incrementor symbol combination, the player of the second gaming device is provided the dynamic award (which had been previously increased based on generated symbol combination from the first gaming device). Thus, the greater the number of gaming devices in the gaming system that are each linked or otherwise associated with the dynamic paytable described above, the greater the amount of volatility experienced by the players at such gaming devices. That is, as lower valued symbol combinations (that are associated with a relative high probability of being generated) are frequently generated by the gaming devices in the gaming system, such frequent generations cause the dynamic award amounts of the different target symbol combinations associated with these frequently generated symbol combinations to quickly increase in value. Accordingly, such dynamic awards are funded based on randomly generated outcomes and thus are result driven awards. This configuration provides that for every play of a game by a player at one of the gaming devices in the gaming system, there are a number of award opportunities available. In other words, the unpredictable or volatile nature of the dynamic awards disclosed herein ensure that there is a high probability that at least one dynamic award of the dynamic paytable will be incremented to a desirable award amount to play for. This eliminates the discouragement that certain players feel when such players no longer finds an award desirable or worth the cost of continuing to play. Accordingly, in the gaming system disclosed herein, there is always the chance a player can receive at least one incremented dynamic award for each game played.

The gaming system and method disclosed herein thus provides dynamic awards that increment or increase in value based, at least in part, on one or more random events which occur in association with one or more plays of a game. Such a configuration provides that the more frequently these random events occur, the more frequently the gaming system increases the dynamic awards and the quicker such dynamic awards increase in value.

In another embodiment, the gaming system maintains a bonus event pool which is funded, at least in part, based on a percentage of the award amounts associated with generated symbol combinations. In this embodiment, upon a bonus event pool triggering event, the gaming system redistributes at least a portion of the bonus event pool to a plurality of symbol combinations of the maintained paytable. Such a redistribution of awards from the bonus event pool to the maintained paytable provides a limited period of time in which the symbol combinations of the maintained paytable are associated with enhanced award amounts thus creating a period of increased excitement and enjoyment for players.

In one such embodiment, in addition to or as an alternative to the target symbol combinations and incrementor symbol combinations described herein, a plurality of the symbol combinations of the maintained paytable are bonus event pool contribution symbol combinations. In this embodiment, if the gaming system generates one of the bonus event pool contribution symbol combinations, the gaming system: (i) provides any award associated with the generated bonus event pool contribution symbol combination, and (ii) increases the bonus event pool by a contribution amount associated with the generated bonus event pool contribution symbol combination. Upon an occurrence of a bonus event pool triggering event, such as upon the generation of a bonus event pool triggering symbol combination, the gaming system utilizes part or all of the bonus event pool to temporarily increase the awards associated with a plurality of symbol combinations of the paytable. In this embodiment, once the gaming system generates a symbol combination associated with an increased award, the gaming system resets the award associated with that symbol combination to a default or reset award. Such a redistribution of the bonus event pool to a plurality of symbol combinations of the paytable provides a bonus frenzy type environment in which certain symbol combinations are temporarily associated with greater awards.

Accordingly, the gaming system and method disclosed herein shifts, redistributes or reallocates the amounts that different gaming system features contribute to the overall average expected payback percentage of the gaming system. In one such embodiment, the gaming system provides that certain features of the gaming system each have a preset component of the average expected payback percentage of the gaming system and such features also have a dynamic or variable component of the average expected payback percentage. In this embodiment, the gaming system is configured to shift such dynamic components amongst the different features without changing the overall average expected payback percentage of the gaming system.

Additional features and advantages are described herein, and will be apparent from the following Detailed Description and the figures.

BRIEF DESCRIPTION OF THE FIGURES

FIGS. 4A and 4B are a sample dynamic payout matrix of one embodiment of the gaming system disclosed herein illustrating a plurality of incrementor symbol combinations and a plurality of target symbol combinations.

FIGS. 5A, 5B and 5C are schematic diagrams illustrating the transferring of values from incrementor symbol combinations to target symbol combinations of one example embodiment of a dynamic payout matrix of the gaming system disclosed herein.

FIGS. 6A, 6B, 6C and 6D are front plan views of one embodiment of the gaming system disclosed herein illustrating the generation of different symbol combinations and the effect such generations have on the dynamic awards of other non-generated symbol combinations.

FIG. 8 is a sample dynamic payout matrix of one embodiment of the gaming system disclosed herein illustrating the funding of a reset pool.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
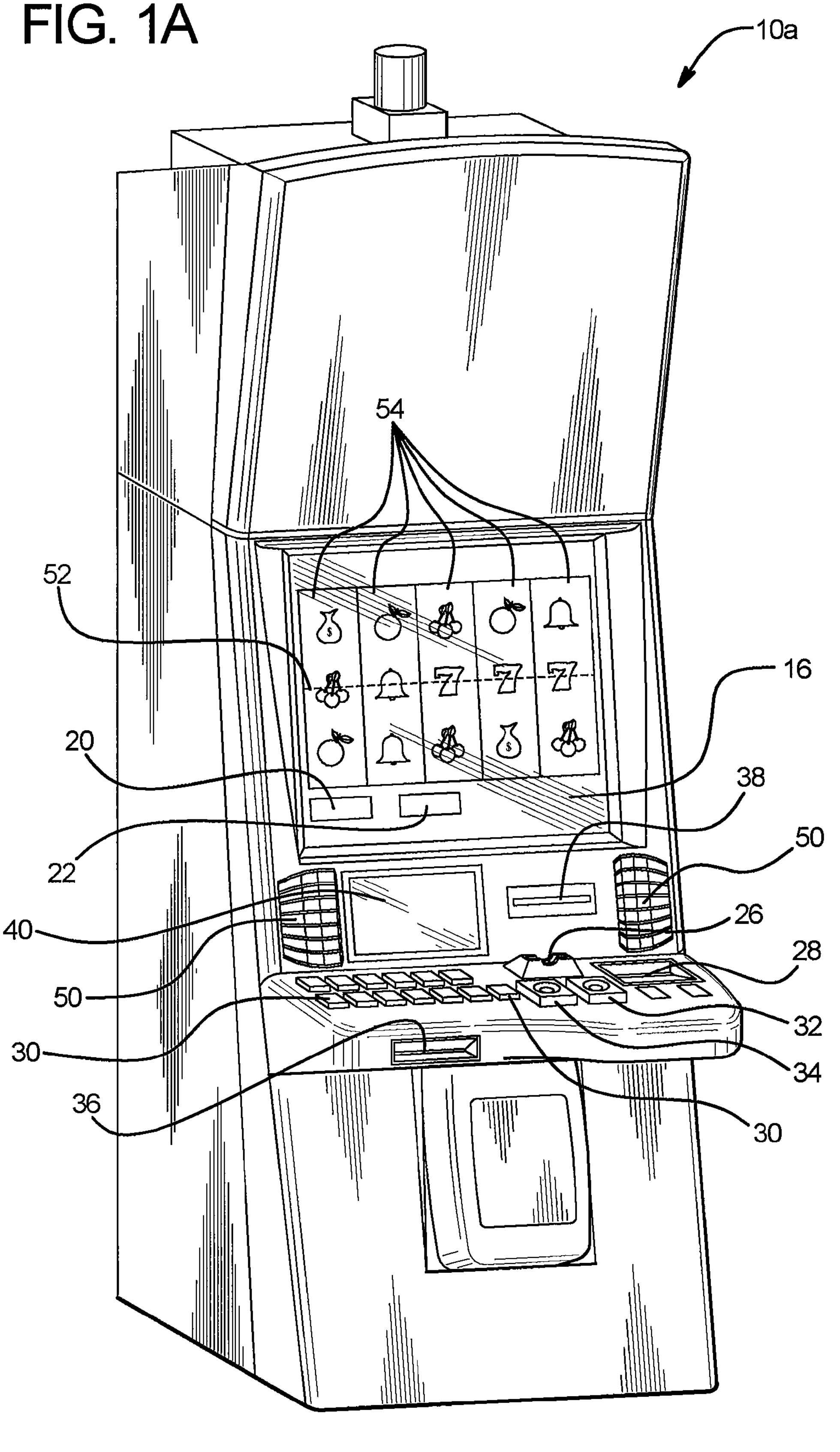
FIGS. 1A and 1B are perspective views of example alternative embodiments of the gaming device of the present disclosure.
Figure 1B:
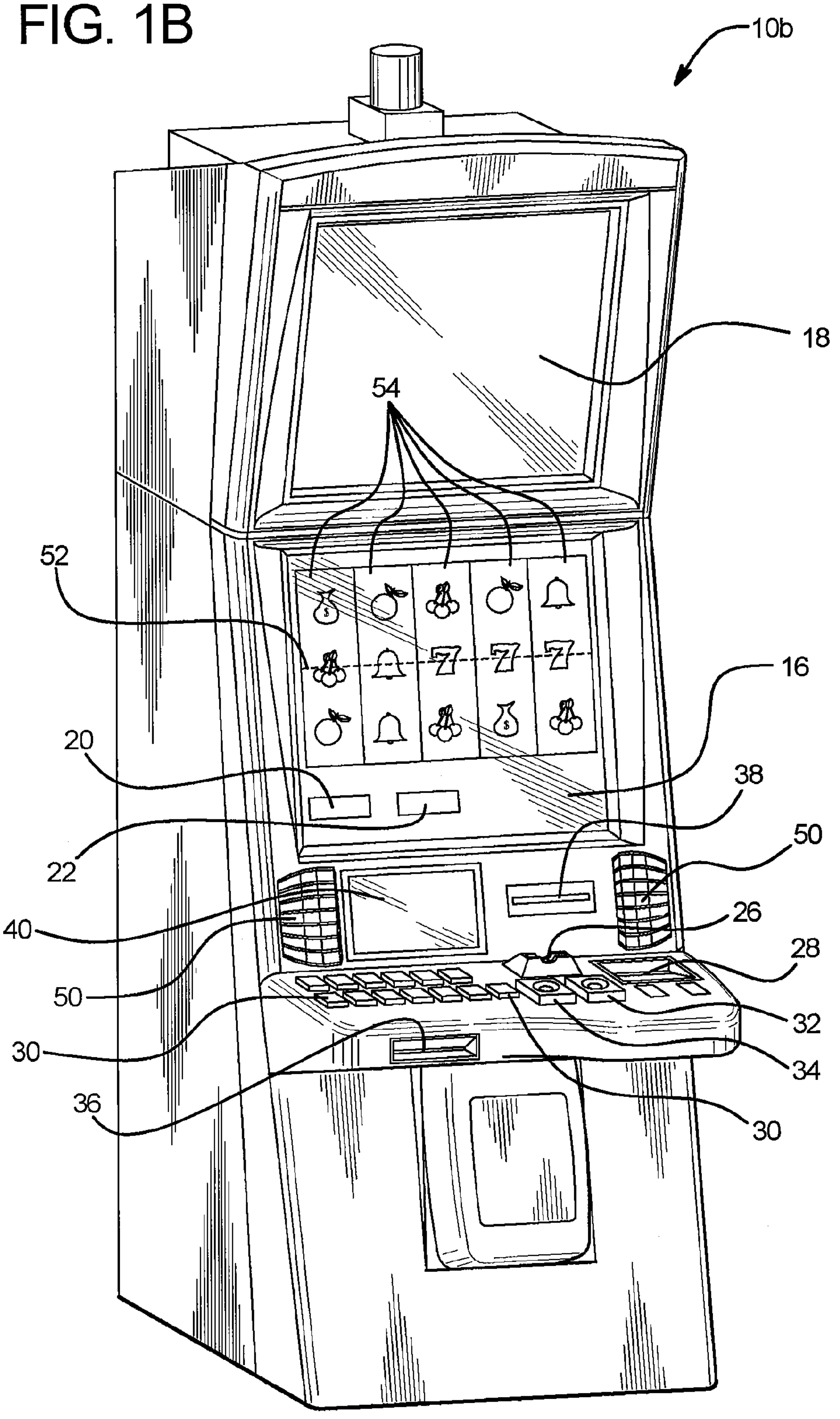

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
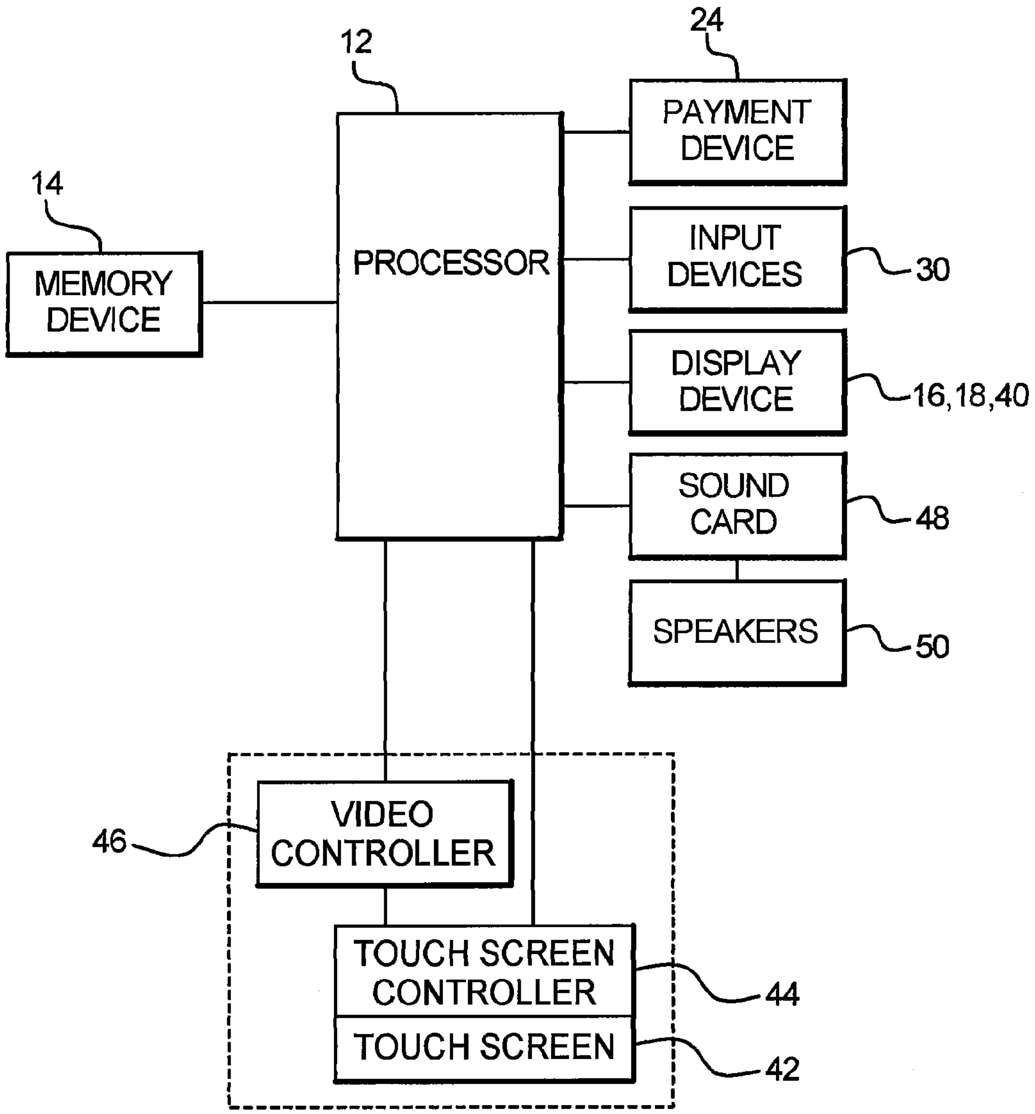
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a hand-held device, such as a personal digital assistant (PDA), a portable computing or mobile device, or another computerized platform to implement the present disclosure. In one embodiment, the gaming device or gaming machine disclosed herein is operable over a wireless network, for example as part of a wireless gaming system. In one such embodiment, the gaming machine may be a hand-held device, a mobile device, or any other suitable wireless device that enables a player to play any suitable game at a variety of different locations. In various embodiments in which the gaming device or gaming machine is a hand-held device, a mobile device, or any other suitable wireless device, at least one memory device and at least one processor which control the game or other operations of the hand-held device, mobile device, or other suitable wireless device may be located: (a) at the hand-held device, mobile device or other suitable wireless device; (b) at a central server or central controller; or (c) any suitable combination of the central server or central controller and the hand-held device, mobile device or other suitable wireless device. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a “computer” or “controller.”

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player’s current number of credits, cash, account balance, or the equivalent. In one embodiment, the gaming device includes a bet display 22 which displays a player’s amount wagered. In one embodiment, as described in more detail below, the gaming device includes a player tracking display 40 which displays information regarding a player’s play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player’s identification, credit totals (or related data), and other relevant information. In another embodiment, a player may carry a portable device, such as a cell phone, a radio frequency identification tag, or any other suitable wireless device, which communicates a player’s identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
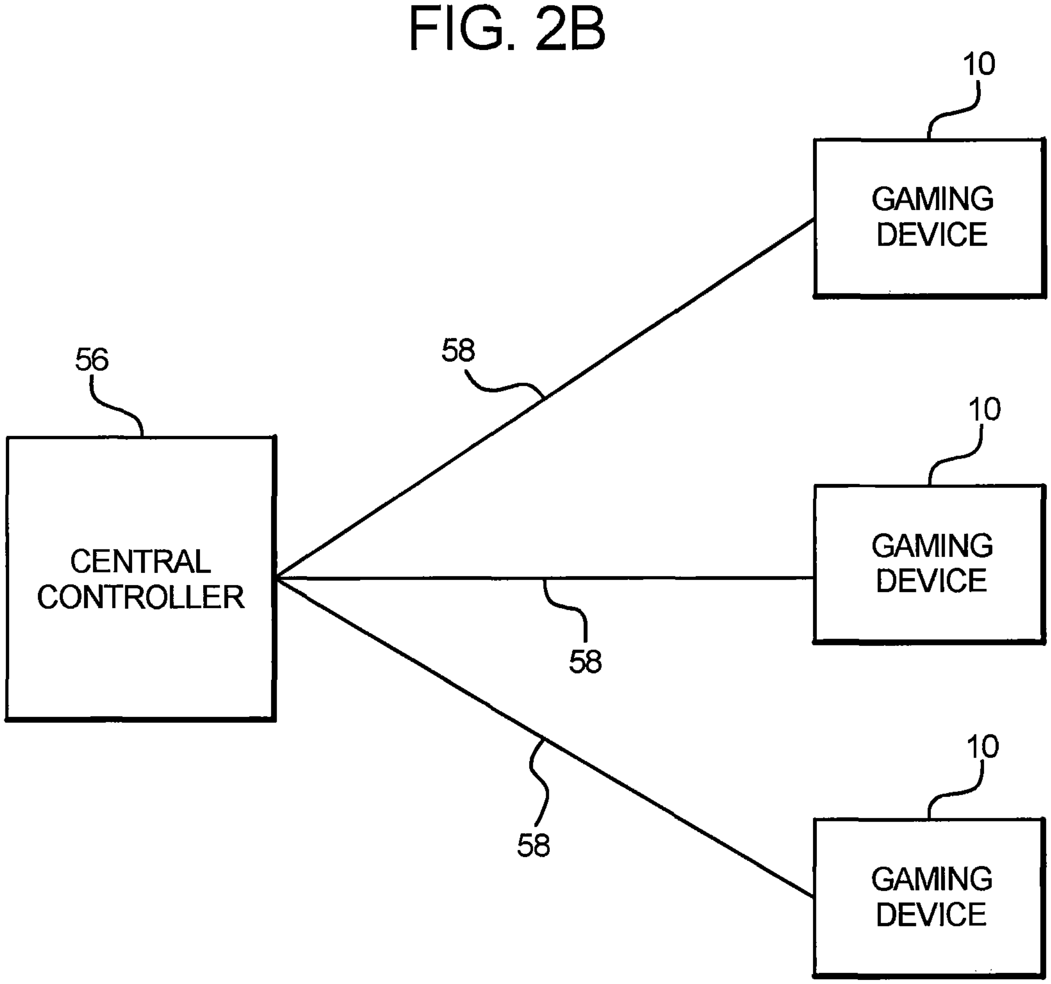
FIG. 2B is a schematic block diagram of one embodiment of a gaming system network configuration including a plurality of gaming devices disclosed herein.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or preset on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In one embodiment, a plurality of players at a plurality of linked gaming devices in the gaming system disclosed herein participate in a group gaming environment. In one embodiment, the gaming system maintains that a target total gaming system probability of triggering a group bonus event is reached for the players of the gaming devices in the gaming system regardless of the number of players playing such gaming devices in the gaming system.

Dynamic Awards

In various embodiments, the gaming system and method disclosed herein provides one or more dynamic payout matrixes or dynamic paytables. Each dynamic payout matrix or paytable includes a plurality of target symbol combinations that are each associated with a dynamic award. Each dynamic payout matrix or paytable also includes a plurality of incrementor symbol combinations that are each associated with a predefined increment amount and at least one of the target symbol combinations. As described below, such a configuration provides that the current value of each dynamic award is based, at least in part, on a quantity of times another symbol combination is randomly generated.

Figure 3:
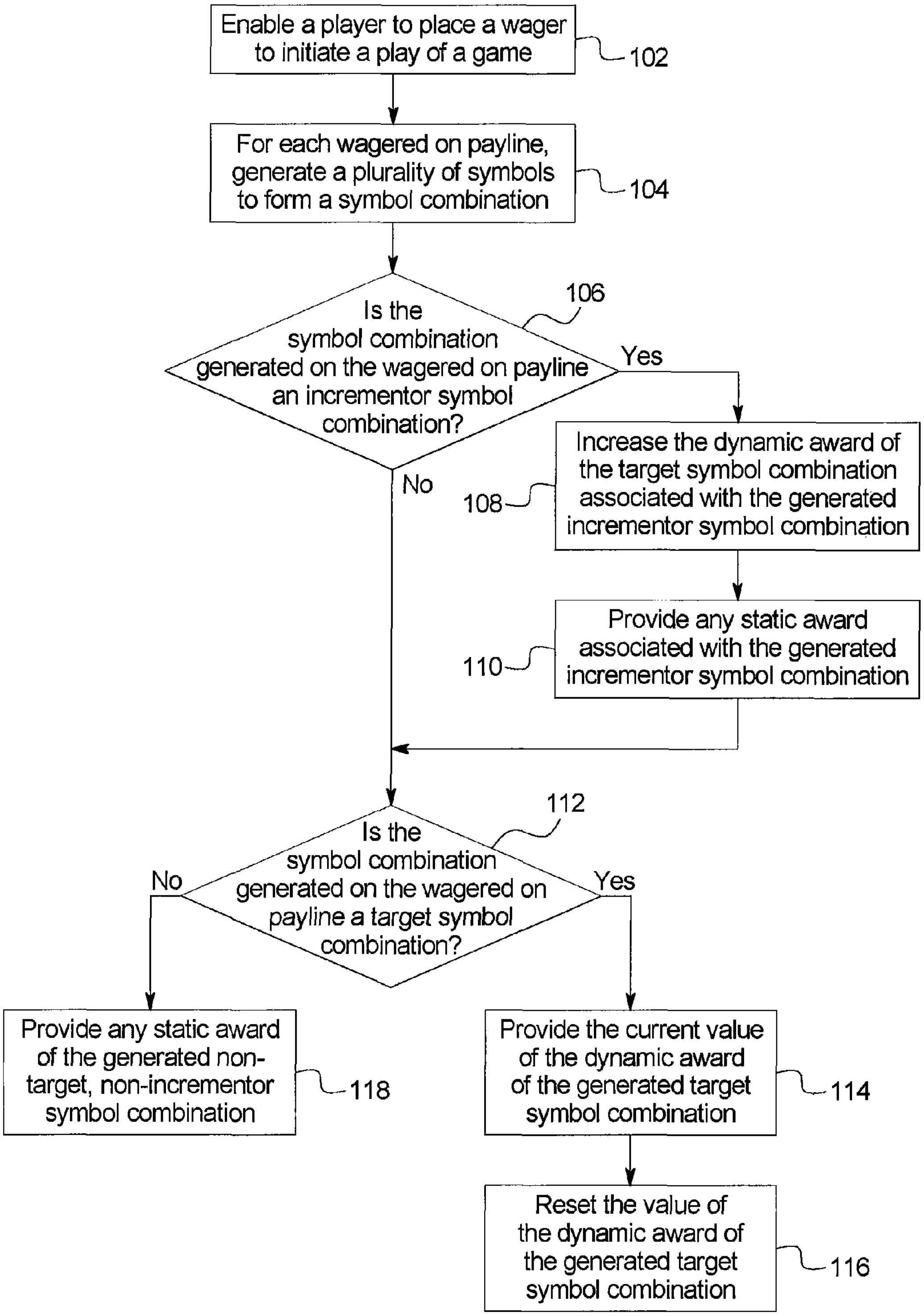
FIG. 3 is a flow-chart of one embodiment of the gaming system disclosed herein illustrating a modification of the dynamic award of one non-generated symbol combination based on the random generation of another symbol combination.

Referring to FIG. 3, in one embodiment, the gaming system enables a player to place a wager to initiate a play of a game of a gaming device as indicated by block 102. After the player's wager, for each wagered on payline, the gaming system generates a plurality of symbols to form a symbol combination as indicated in block 104 of FIG. 3. In one embodiment, the gaming system randomly generates the plurality of symbols to form the symbol combination.

After generating the symbols to form the generated symbol combination, as indicated in diamond 106, the gaming system determines, for each wagered on payline, if the generated symbol combination is an incrementor symbol combination. As described below, an incrementor symbol combination is associated with a predefined increment amount and at least one target symbol combination having a dynamic award. For example, as seen in the sample payout matrix illustrated in FIGS. 4A and 4B, the any fruit symbol—blank—any fruit symbol combination is an incrementor symbol combination associated with a predefined increment amount of one credit and the target symbol combination of any fruit symbol—any fruit symbol—any fruit symbol.

In one embodiment, the applicable payout matrix of the gaming system disclosed herein includes a plurality of incrementor symbol combinations. In one such embodiment, zero, one or more of the incrementor symbol combinations are winning symbol combinations which are each associated with an award amount greater than zero. In one such embodiment, zero, one or more of the incrementor symbol combinations are losing symbol combinations which are each associated with an award amount of zero. For example, as seen in the sample payout matrix illustrated in FIGS. 4A and 4B, the any fruit symbol—blank—any fruit symbol incrementor symbol combination described above is a losing symbol combination associated with an award amount of zero.

If the gaming system determines that the generated symbol combination is an incrementor symbol combination, as indicated in block 108 of FIG. 3, the gaming system increases the dynamic award of the target symbol combination associated with the generated incrementor symbol combination. After increasing the dynamic award of the associated target symbol combination, the gaming system provides any static or preset award associated with the generated incrementor symbol combination as indicated in block 110. For example, according to the sample payout matrix illustrated in FIGS. 4A and 4B, if the gaming system generates the incrementor symbol combination of any fruit symbol—blank—any fruit symbol, the gaming system increases the dynamic award of the associated target symbol combination of any fruit symbol—any fruit symbol—any fruit symbol by the predefined increment amount of one credit. In this example, the gaming system determines that the generated symbol combination of any fruit symbol—blank—any fruit symbol is a losing symbol combination associated with an award amount of zero and thus the gaming system does not provide any static or preset award to the player for this generated symbol combination.

In one embodiment, an incrementor symbol combination is associated with a plurality of target symbol combinations and an individual predefined increment amount for each associated target symbol combination. In this embodiment, if the gaming system generates such an incrementor symbol combination, the gaming system increases each dynamic award of each target symbol combination associated with the generated incrementor symbol combination. For example, as seen in the sample payout matrix illustrated in FIGS. 4A and 4B, the any fruit symbol—any seven symbol—any bar symbol combination is an incrementor symbol combination associated with: (i) a predefined increment amount of one credit for the target symbol combination of any fruit symbol—any fruit symbol—any fruit symbol, and (ii) a predefined increment amount of one credit for the target symbol combination of any bar symbol—any bar symbol—any bar symbol. In this example, if the gaming system generates the incrementor symbol combination of any fruit symbol—any seven symbol—any bar symbol combination, the gaming system increases: (i) the dynamic award of the first associated target symbol combination of any fruit symbol—any fruit symbol—any fruit symbol by the first predefined increment amount of one credit, and (ii) the dynamic award of the second associated target symbol combination of any bar symbol—any bar symbol—any bar symbol by the second predefined increment amount of one credit.

Referring back to FIG. 3. after providing any static award or if the generated symbol combination is not an incrementor symbol combination, the gaming system determines, for each wagered on payline, if the generated symbol combination is a target symbol combination as indicated in diamond 112. As described above, a target symbol combination is associated with a dynamic award amount, a reset amount for the dynamic award amount and one or more incrementor symbol combinations. For example, as seen in the sample payout matrix illustrated in FIGS. 4A and 4B, the jackpot symbol—jackpot symbol—jackpot symbol combination is a target symbol combination associated with a dynamic award amount that resets to one-hundred credits.

If the gaming system determines that the generated symbol combination is a target symbol combination, as indicated in block 114 of FIG. 3, the gaming system provides the current value of dynamic award of the generated target symbol combination. The gaming system then resets the value of the dynamic award of the generated target symbol combination as indicated in block 116 and concludes the play of the game. It should be appreciated that the current value of the dynamic award provided to a player for the generation of a target symbol combination is based on if any incrementor symbol combinations associated with that target symbol combination have been generated and the quantity of times such incrementor symbol combinations have been generated since the last time that target symbol combination was generated. Accordingly, the dynamic award provided to a player may be based on: (i) the random generation of the target symbol combination associated with the provided dynamic award, and (ii) one or more random generations of one or more incrementor symbol combinations associated with that target symbol combination. For example, according to the sample payout matrix illustrated in FIGS. 4A and 4B, if the gaming system generates the target symbol combination of jackpot symbol—jackpot symbol—jackpot symbol (and various associated incrementor symbol combinations have been previously generated to cause the current value of this target symbol combination to increase from one-hundred credits to one-hundred-seventy-six credits), the gaming system provides the current value of one-hundred-seventy-six credits of the dynamic award of the jackpot symbol—jackpot symbol—jackpot symbol combination and resets the value of the dynamic award of this generated target symbol combination to one-hundred credits.

Such a configuration provides that part or all of an award associated with a first symbol combination generated on a first payline at a first point in time is shifted, reallocated or redistributed to a second non-generated symbol combination which is not generated on the first payline. Accordingly, for a gaming system including a single gaming device, if that single gaming device subsequently generates the second symbol combination at a second point in time, then either the same player that was playing at the first point in time or a different player that was playing the single gaming device at the second point in time is provided a dynamic award which includes part or all of the award associated with the previously generated first symbol combination. Moreover, for a gaming system including a bank of gaming devices, as described in more detail below, if a first gaming device generates the first symbol combination at a first point in time and a second one of the gaming devices subsequently generates the second symbol combination at a second point in time, then a different player that was playing the second one of the gaming devices at the second point in time is provided a dynamic award which includes part or all of the award associated with the first symbol combination previously generated at the first gaming machine.

On the other hand, if the gaming system determines that the generated symbol combinations is not a target symbol combination, as indicated in block 118 of FIG. 3, the gaming system provides any static or preset award of the generated non-target, non-incrementor symbol combination. In one embodiment, one or more of the symbol combinations of the applicable payout matrix are neither target symbol combinations nor incrementor symbol combinations (i.e., non-action symbol combinations). In this embodiment, if the gaming system generates any of these symbol combinations, any static award associated with such symbol combinations is provided to the player and the play of the game concludes. In another embodiment, each of the symbol combinations of the dynamic payout matrix are either a target symbol combination, an incrementor symbol combination or both (as described below).

In one embodiment, a target symbol combination is associated with a plurality of incrementor symbol combinations. In this embodiment, for each associated incrementor symbol combination generated, the gaming system increases the dynamic award of the target symbol combination by the predefined increment amount of the generated incrementor symbol combination. For example, as seen in FIGS. 4A and 4B, the target symbol combination of jackpot symbol—jackpot symbol—jackpot symbol is associated with:

(i) the incrementor symbol combination of any seven symbol—any bar symbol—blank having a predefined increment amount of two credits, (ii) the incrementor symbol combination of blank—blank—blank having a predefined increment amount of four credits, and (iii) the incrementor symbol combination of red seven symbol—red seven symbol—red seven symbol having a predefined increment amount of twenty-credits.

Accordingly, in this example, if prior to the generation of the target symbol combination of jackpot symbol—jackpot symbol—jackpot symbol:

(i) the symbol combination of any seven symbol—any bar symbol—blank is generated eight times, (ii) the symbol combination of blank—blank—blank is generated five times and (iii) the symbol combination of red seven symbol—red seven symbol—red seven symbol is generated twice, then the dynamic award for the target symbol combination of jackpot symbol—jackpot symbol—jackpot symbol is one-hundred-seventy-six credits (or 100 (the reset of the dynamic award for this target symbol combination)+16 (a predefined increment amount of 2 credits for the symbol combination of any seven symbol—any bar symbol—blank×8 generations of this symbol combination)+20 (a predefined increment amount of 4 credits for the symbol combination of blank—blank—blank×5 generations of this symbol combination)+40 (a predefined increment amount of 20 credits for the symbol combination of red seven symbol—red seven symbol—red seven symbol×2 generations of this symbol combination).

In one embodiment, a plurality of the symbol combinations each function both as a target symbol combination and as an incrementor symbol combination. In this embodiment, if the gaming system generates such an incrementor/target symbol combination, the gaming system provides to a player part or all of the dynamic award amount associated with that incrementor/target symbol combination and also increments the dynamic award amount of another symbol combination (which is associated with the generated incrementor/target symbol combination) by the increment amount of the generated incrementor/target symbol combination. Accordingly, the gaming system disclosed herein includes a plurality of symbol combinations classified as action symbol combinations which when generated, cause the gaming system to:

(i) increase the dynamic award of another symbol combination (i.e., incrementor symbol combinations), (ii) provide the current value of the dynamic award of the generated symbol combination and reset the dynamic award (i.e., target symbol combinations), or (iii) increase the dynamic award of another symbol combination, provide the current value of the dynamic award of the generated symbol combination and reset the dynamic award (i.e., incrementor/target symbol combinations).

In one example of an incrementor/target symbol combination, as seen in the sample payout matrix of FIGS. 4A and 4B, the symbol combination of plum symbol—plum symbol—plum symbol is such an incrementor/target symbol combination. In this example, the symbol combination of plum symbol—plum symbol—plum symbol functions as a target symbol (having a dynamic award with a reset award of ten credits) with respect to the symbol combinations of (i) two bar symbol—two bar symbol—two bar symbol, and (ii) any fruit symbol—any bar symbol—blank. Thus, each time the symbol combination of two bar symbol—two bar symbol—two bar symbol is generated and each time the symbol combination of any fruit symbol—any bar symbol—blank is generated, the dynamic award for the symbol combination of plum symbol—plum symbol—plum symbol will increase by the appropriate predefined increment amount. In this example, the symbol combination of plum symbol—plum symbol—plum symbol also functions as an incrementor symbol combination having a predefined increment amount of ten credits and associated with the symbol combination of three bar symbol—three bar symbol—three bar symbol. Thus, each time the gaming system generates the symbol combination of plum symbol—plum symbol—plum symbol, the gaming system:

(i) provides the current value of the dynamic award of the generated symbol combination of plum symbol—plum symbol—plum symbol, (ii) resets the provided dynamic award of the symbol combination of plum symbol—plum symbol—plum symbol, and (iii) increases the dynamic award of the symbol combination of three bar symbol—three bar symbol—three bar symbol by the increment amount of ten credits.

Accordingly, the gaming system disclosed herein provides that the current value of the dynamic award provided to a player for the generation of a target symbol combination is based on if any incrementor symbol combinations associated with that target symbol combination have been generated and the quantity of times such incrementor symbol combinations have been generated. Thus, any dynamic awards provided to a player may be based on: (i) the random generation of the target symbol combination associated with the provided dynamic award, and (ii) one or more random generations of one or more incrementor symbol combinations associated with that target symbol combination. Such a configuration provides a degree of randomness and thus an increased level of volatility to the award values of any dynamic awards provided to a player.

For example, FIGS. 5A to 5C illustrate the interactions between the generations of different incrementor symbol combinations and the increase of the dynamic awards of different target symbol combinations. In this example, FIG. 5A illustrates the gaming system after each of the dynamic awards are reset (i.e., at an initial start up of the gaming system) and FIG. 5B illustrates the gaming system after the generation of a plurality of incrementor symbol combinations and thus the increase in the dynamic award component for various target symbol combinations. As further seen in FIG. 5C, as different incrementor symbol combinations are generated, the static or preset amount associated with such generated incrementor symbol combinations is transferred to (or otherwise increases) the dynamic awards of any applicable target symbol combinations. For example, upon the generation of the incrementor symbol combination of any sevens symbol—any sevens symbol—any sevens symbol, the static amount associated with such an incrementor symbol combination is transferred to the dynamic award component for the applicable target symbol combination of melon symbol—melon symbol—melon symbol.

Referring now to FIG. 6A, in operation of one example embodiment of the gaming system disclosed herein, the gaming system enables a player to place a wager on payline 52 to generate a plurality of symbols on reels 54*a*, 54*b* and 54*c*. Appropriate messaging, such as "PLEASE PLACE A WAGER TO GENERATE A SYMBOL COMBINATION" and "GOOD LUCK" may be provided through any suitable audio, audio-visual or visual devices. In this example, as seen in FIG. 6A, the gaming system also displays to the player a paytable 150 of winning symbol combinations 152*a* and the current value of the dynamic award 152*b* associated with each winning symbol combination. As seen in FIG. 6A and according to the sample payout matrix of FIGS. 4A and 4B, each of the awards associated with each of these winning symbol combinations is currently valued at the reset amount for that winning symbol combination.

As seen in FIG. 6B, after the player wagered on payline 52, the gaming system randomly generated a plurality of symbols including the losing symbol combination of melon symbol—two bar symbol—blank on the wagered on payline. This losing symbol combination is not associated with an award amount and thus the award display 154 indicates an award of zero. In this example, the generated symbol combination is an incrementor symbol combination associated with the target symbol combination of plum symbol—plum symbol—plum symbol and a predefined increment amount of one credit. Accordingly, as seen in paytable 150, the gaming system increased the dynamic award of the target symbol combination of plum symbol—plum symbol—plum symbol by the predefined increment amount of one credit (to result in a current displayed value of this dynamic award of eleven credits). It should be appreciated that in conjunction with modifying the awards associated with one or more symbol combinations, as seen in FIGS. 6B to 6D, the gaming system displays to the player a paytable 150 of winning symbol combinations 152*a*, the value of the dynamic award 152*b* associated with each winning symbol combination prior to the symbol generation and the value of the dynamic award 152*c* associated with each winning symbol combination after the symbol generation.

As further seen in FIG. 6B, in this example, the generated symbol combination is also an incrementor symbol combination associated with the target symbol combination of any bar symbol—any bar symbol—any bar symbol and a predefined increment amount of one credit. Accordingly, as seen in paytable 150, the gaming system increased the dynamic award of the target symbol combination of any bar symbol—any bar symbol—any bar symbol by the predefined increment amount of one credit (to result in a current displayed value of this dynamic award of three credits). Accordingly, in this illustrated example, for each and only each of any target symbol combinations associated with the generated incrementor symbol combination, the gaming system increased the dynamic award of each associated target symbol combination. Appropriate messaging, such as "YOU GENERATED A LOSING SYMBOL COMBINATION", "HOWEVER, YOUR GENERATED LOSING SYMBOL COMBINATION CAUSED THE AWARD FOR THE WINNING THREE PLUM SYMBOL COMBINATION TO INCREASE BY 1 CREDIT TO 11 CREDITS" and "YOUR GENERATED LOSING SYMBOL COMBINATION ALSO CAUSED THE AWARD FOR ANY THREE BAR SYMBOLS TO INCREASE BY 1 CREDIT TO 3 CREDITS" may be provided through any suitable audio, audio-visual or visual devices.

As seen in FIG. 6C, after the gaming system increased the dynamic awards of two different target symbol combinations and after the player placed another wager on payline 52, the gaming system randomly generated a plurality of symbols including the winning symbol combination of plum symbol—plum symbol—plum symbol on the wagered on payline. This winning symbol combination is a target symbol combination associated with a dynamic award currently valued at eleven credits and thus the award display 154 indicates an award of eleven credits. After providing the current value of the dynamic award of the generated target symbol combination, the gaming system resets the value of the dynamic award to the reset value of ten credits (as displayed in paytable 150). As described below, the reset value of the dynamic award may be a static amount or a variable amount. Appropriate messaging, such as "YOU GENERATED A WINNING SYMBOL COMBINATION OF THREE PLUM SYMBOLS", "YOU WIN 11 CREDITS FOR THE THREE PLUM SYMBOL COMBINATION" and "THE THREE PLUM SYMBOL COMBINATION WILL NOW RESET TO 10 CREDITS" may be provided through any suitable audio, audio-visual or visual devices.

As further seen in FIG. 6C, in this example, in addition to being a target symbol combination, the generated symbol combination is also an incrementor symbol combination associated with the target symbol combination of three bars symbol—three bars symbol—three bars symbol and a predefined increment amount of ten credits. That is, the generated symbol combination of plum symbol—plum symbol—plum symbol is an incrementor/target symbol combination which functions both as an incrementor symbol (with respect to one or more other symbol combinations) and as a target symbol combination with a dynamic award. Accordingly, as seen in paytable 150, the gaming system increased the dynamic award of only the target symbol combination of three bars symbol—three bars symbol—three bars symbol by the predefined increment amount of ten credits (to result in a current displayed value of this dynamic award of twenty-five credits). Appropriate messaging, such as "THE THREE PLUM SYMBOL COMBINATION ALSO CAUSED THE AWARD FOR THE THREE THREE BAR SYMBOL COMBINATION TO INCREASE BY 10 CREDITS TO 25 CREDITS" may be provided through any suitable audio, audio-visual or visual devices.

As seen in FIG. 6D, after a period of time in which a number of plays of the wagering game occurred (and as indicated by paytable 150, after a number of incrementor symbol combinations were generated to cause a number of dynamic awards of a number of target symbol combinations to increase), upon placement of another wager on payline 52, the gaming system randomly generated a plurality of symbols including the winning symbol combination of jackpot symbol—jackpot symbol—jackpot symbol on the wagered on payline. This winning symbol combination is a target symbol combination associated with a dynamic award currently valued at one-hundred-sixty-seven credits and thus the award display 154 indicates an award of one-hundred-sixty-seven credits. After providing the current value of the dynamic award of the generated target symbol combination, the gaming system resets the value of the dynamic award to the reset value of one-hundred credits. Appropriate messaging, such as "YOU GENERATED A WINNING SYMBOL COMBINATION OF THREE JACKPOT SYMBOLS", "YOU WIN 167 CREDITS FOR THE THREE JACKPOT SYMBOL COMBINATION" and "THE THREE JACKPOT SYMBOL COMBINATION WILL NOW RESET TO 100 CREDITS" may be provided through any suitable audio, audio-visual or visual devices. It should be appreciated that although this example embodiment is illustrated with one wagered on payline, the gaming system is configured to enable the player to wager on a plurality of paylines wherein the analysis for each payline proceeds as described herein. It should be further appreciated that although this example embodiment is illustrated with three reels, the gaming system is configured to implement the dynamic paytable described herein with any suitable number of reels. Moreover, although this example embodiment is illustrated as a wagering primary game, the dynamic paytable described herein is configured to be implemented in accordance with a non-wagering game, such as a free spin bonus game.

In these example embodiments, the gaming system displays the real-time or substantially real-time values of each dynamic award to the player. Such a configuration provides additional excitement and enjoyment for players as the player views the dynamic awards of the paytable increasing in value until such dynamic awards are reset (or until an ending of the gaming session including such dynamic awards). In one such embodiment, when the value of a dynamic award changes, the gaming system displays the increased value of the dynamic award flashing to alert the player of such an award increase. In one such embodiment, when the value of a dynamic award changes, the gaming system separately displays the increased value of the dynamic award, such as by using one or more indicators to alert the player of such an award increase. In another such embodiment, the gaming system utilizes one or more meters to convey to the player the increase in any dynamic awards. In another such embodiment, the gaming system only displays the values of the dynamic awards that have changed (i.e., the gaming system temporarily masks the symbol combinations and dynamic awards with values that have not changed to highlight the display of the symbol combinations and dynamic awards with increased values).

It should be appreciated that when a group or plurality of gaming devices each provide games that utilize the dynamic paytable described herein, the frequent generations of different incrementor symbol combinations at different gaming devices cause frequent increases of dynamic awards of target symbol combinations for all of the group or plurality of gaming devices. That is, the occurrence of a random generation at one gaming device in a bank of gaming devices affects the award available to be provided to a player at another gaming device in the bank of gaming devices. Thus, the greater the number of gaming devices in the bank of gaming devices in the gaming system that are each linked or otherwise associated with the dynamic paytable described above, the greater the amount of volatility experienced by the players at such gaming devices. That is, as lower valued symbol combinations (that are associated with a relative high probability of being generated) are frequently generated by the gaming devices in the gaming system, such frequent generations cause the dynamic award amounts of the different target symbol combinations associated with these frequently generated symbol combinations to quickly increase in value.

Figure 7:
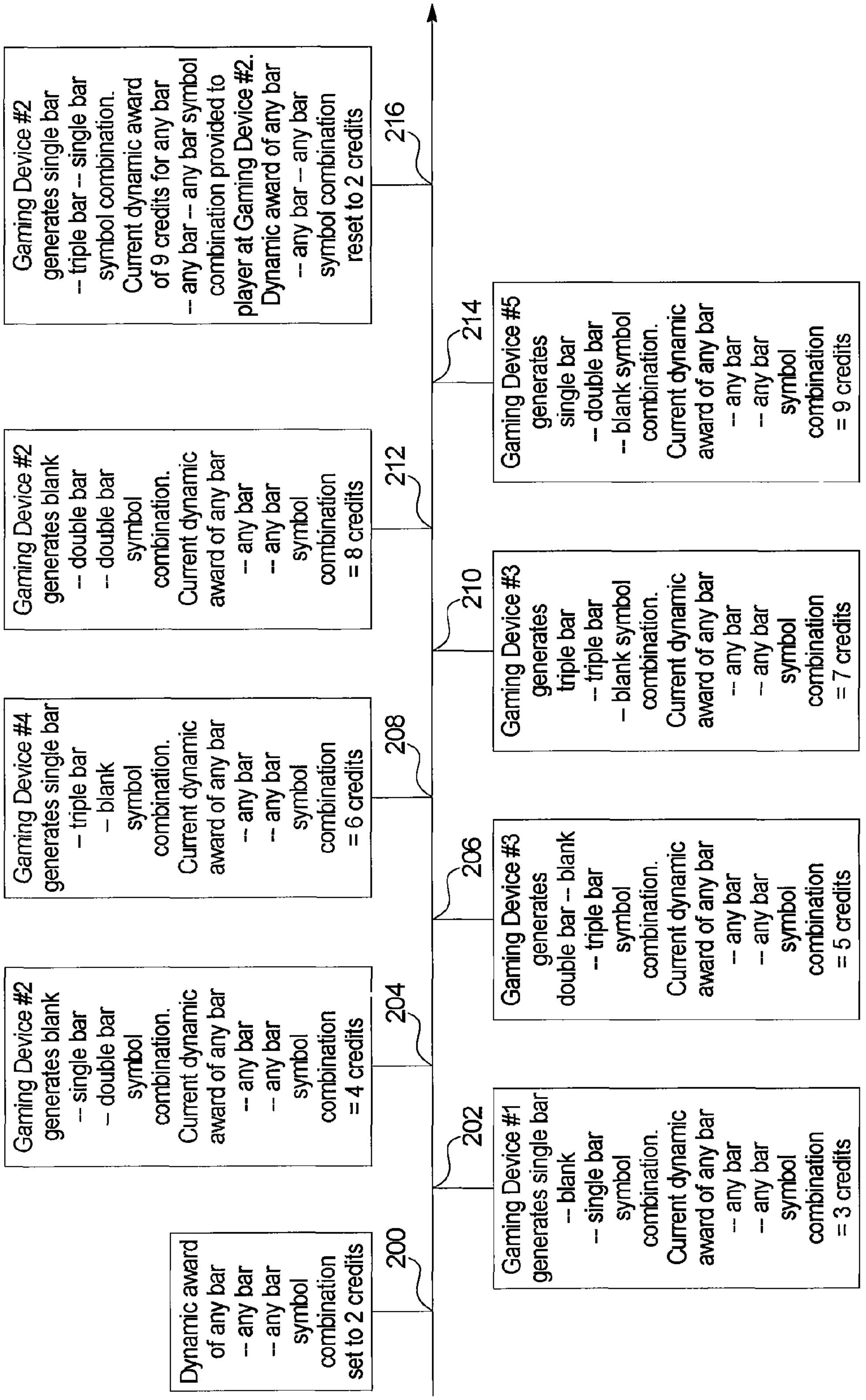
FIG. 7 is a timeline illustrating the changes to the dynamic award of one symbol combination at different points in time based on the generation of another symbol combination.

For example, as seen in FIG. 7, at a first point in time 200, the dynamic award for a target symbol combination (e.g., the symbol combination of any bar symbol—any bar symbol any bar symbol) is set to an amount of two credits. Following this first point in time, a first gaming device generates an incrementor symbol combination (e.g., the symbol combination of single bar symbol—blank—single bar symbol) associated with the target symbol combination at a second point in time 202. In this example, at this second point in time, the gaming system increases the dynamic award of the target symbol combination such that the current value of the dynamic award for this target symbol combination is three credits. Following with this example, at a third point in time 204, a second gaming device generates an incrementor symbol combination (e.g., the symbol combination of blank—single bar symbol—double bar symbol) also associated with the target symbol combination and thus the gaming system further increases the dynamic award of the target symbol combination such that the current value of the dynamic award for this target symbol combination is four credits. At different points in time 206, 208, 210, 212 and 214, the different gaming devices in the gaming system generate different incrementor symbol combinations associated with the target symbol combination and thus the gaming system increases the dynamic award of this target symbol combination. This increasing of the dynamic award continues until point in time 216 when the second gaming device generates the target symbol combination. At this point in time, the second gaming device provides the current value of nine credits of the dynamic award of this generated target symbol combination to the player at the second gaming device and the gaming system resets the dynamic award for the generated target symbol combination.

As seen in the above-described example, such a configuration provides that for every play of a game by a player at one of the gaming devices in the gaming system, there are a number of award opportunities available. In other words, the unpredictable or volatile nature of the dynamic awards disclosed herein ensure that there is a high probability that at least one dynamic award of the dynamic paytable will be incremented to a desirable award amount to play for. This eliminates the discouragement that certain players feel when such players no longer finds an award desirable or worth the cost of continuing to play. Accordingly, in various embodiments of the gaming system disclosed herein, there is nearly always the chance a player can receive at least one incremented dynamic award for each game played.

In one embodiment, as described above, if the gaming system randomly generates a target symbol combination, the gaming system provides the dynamic award of that target symbol combination and resets the dynamic award to a set amount. In another embodiment, if the gaming system randomly generates a target symbol combination, the gaming system provides the dynamic award of that target symbol combination and resets the dynamic award to a variable amount. In this embodiment, the gaming system maintains a dynamic award reset value pool. The gaming system funds the dynamic award reset value pool based on a percentage of the increment amounts that are redistributed from one symbol combination to another symbol combination. That is, a reset pool is funded by a percentage of funds as they transfer to different dynamic awards in the dynamic paytable described herein. For example, as seen in FIG. 8, if a symbol combination of three cherry symbols is generated, an immediate payout would be awarded to the player and the dynamic award of the target symbol combination of four cherry symbols would increase as described above. Additionally, in this example, 4% of the funds that would have been allocated to the dynamic award of the target symbol combination of four cherry symbols are reallocated to fund the dynamic award reset value pool. Accordingly, in this embodiment, if the gaming system generates an incrementor symbol combination, the gaming system:

(i) provides an award associated with the generated incrementor symbol combination,
(ii) funds the dynamic award reset value pool with a percentage of the predefined increment amount associated with the generated incrementor symbol combination, and
(iii) increases the dynamic award of the associated target symbol combination by another percentage of the predefined increment amount associated with the generated incrementor symbol combination.

Such variable reset amounts enable the dynamic awards of the present disclosure to start increasing from a higher reset amount and thus quickly increase to higher values.

In this embodiment, if the gaming system randomly generates a target symbol combination, the gaming system determines, based on the amount currently in the dynamic award reset value pool and zero, one or more gaming conditions, an amount to reset the dynamic award of the generated target symbol combination. That is, rather than providing either no reset value or a static reset value when a target symbol combination is generated, the gaming system of this embodiment analyzes factors such as the total current reset pool and the current values of dynamic awards of the dynamic paytable to intelligently reset dynamic awards of target symbol combinations when such target symbol combinations are generated. In this embodiment, when a gaming device generates a target symbol combination, the gaming device provides the current value of the dynamic award of the target symbol combination and requests a reset value from the central controller. The central controller then analyzes the amount in the reset pool and any applicable gaming conditions or applicable gaming rules to determine an amount to reset the dynamic award of the generated target symbol combination. For example, the gaming system includes one or more dynamic award reset value algorithms such as one which allocates up to one-half of the reset pool to any generated target symbol combination but allocates no more than a static, designated limit.

In an alternative embodiment, when the reset pool exceeds a predetermined amount or value, the gaming system triggers a designated period of time in which certain losing symbol combinations become winning symbol combinations. In this embodiment, the gaming system utilizes the amount the reset pool exceeds the predetermined amount to fund the conversion of such losing symbol combinations to winning symbol combinations for the designated period of time. In another embodiment, the gaming system enables the reset pool to temporarily become a negative value.

In another embodiment, if the gaming system generates a designated symbol combination, the gaming system utilizes the predefined increment amount associated with that symbol combination to fund the reset pool. In another embodiment, if the gaming system generates a designated symbol combination, the gaming system provides both the dynamic award and the predefined increment amount associated with that symbol combination to a player.

In one embodiment, the gaming system maintains one reset pool for the plurality of target symbol combinations of the dynamic paytable. In another embodiment, the gaming system maintains a separate reset pool for a plurality of the target symbol combinations of the dynamic paytable. In another embodiment, the gaming system maintains a separate reset pool for each of the plurality of target symbol combinations of the dynamic paytable.

In one embodiment, to fund the dynamic paytable described herein, the gaming system converts certain low-valued winning symbol combinations to losing symbol combinations. For example, to fund the increase of the dynamic award of the target symbol combination of three cherry symbols (when the associated incrementor symbol combination of two cherry symbols is generated), the gaming system converts the winning symbol combination of one cherry symbol (having an award of five credits) to a losing symbol combination (having an award of zero credits). Such a conversion increases the volatility of the gaming system thus increases the level of excitement for certain players.

In one alternative embodiment, one or more of the dynamic awards of one or more of the target symbol combinations disclosed herein are also increased or funded based on an amount of coin-in wagered at the gaming devices in the gaming system. In another embodiment, one or more of the dynamic awards of one or more of the target symbol combinations disclosed herein are also increased or funded via a side bet or side wager. In this embodiment, a player must place or wager a side bet to be eligible to win the dynamic award of the target symbol combination associated with the side bet. In one embodiment, the player must place the maximum bet and the side bet to be eligible to win one of the dynamic awards of one of the target symbol combinations disclosed herein. In another embodiment, one or more of the dynamic awards of one or more of the target symbol combinations are funded, at least in part, by an external source, such as a sponsor. In one such embodiment, the sponsor is associated with one or more branded or advertising symbols which form a target symbol combinations having a dynamic award that is funded, at least in part, by the sponsor. It should be appreciated that one or more of the dynamic awards of one or more of the target symbol combinations may each increase or be funded, at least in part, based on the wagers placed on the primary games of the gaming machines in the gaming system, via a gaming establishment, via a promotion, via a player loyalty system or via any suitable manner.

In alternative embodiments, the gaming system enables a player to select which symbol combinations to designate as target symbol combinations, which symbol combination to designate as incrementor symbol combinations and/or which symbol combinations to designate as incrementor/target symbol combinations. In additional embodiments, the designation of which symbol combinations are target symbol combinations, which symbol combination are incrementor symbol combinations and/or which symbol combinations are incrementor/target symbol combinations is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In another embodiment, the dynamic paytables described herein are individually maintained for each player (i.e., personal dynamic paytables). In this embodiment, as different symbol combinations are generated for a player and different dynamic awards increase, the gaming system tracks the changes to the dynamic paytable for that individual player. That is, the gaming system disclosed herein maintains a dynamic paytable for certain individual players (or groups of individual players) which is stored in association with a player tracking system (such as can be accessed via a player tracking card or other suitable manner). In another embodiment, the current status of a dynamic paytable is stored in association with a ticket or voucher which the player may redeem at a subsequent point in time to access the current dynamic paytable.

In another embodiment wherein the gaming system enables a player to wager different amounts on one or more paylines, the gaming system maintains a separate dynamic paytable for each different wager amount. In this embodiment, if the gaming system generates a target symbol combination having a dynamic award, the gaming system provides the dynamic award of the generated target symbol combination and resets the value of the dynamic award for the dynamic paytable associated with the placed wager amount (and does not adjust the dynamic paytable associated with other non-placed wager amounts). In another embodiment, if the gaming system generates a target symbol combination having a dynamic award, the gaming system provides the dynamic award of the generated target symbol combination and resets the value of the dynamic award for the dynamic paytable associated with the placed wager amount and further adjusts the dynamic paytable associated with the other non-placed wager amounts.

In another embodiment wherein the gaming system enables a player to wager different amounts on one or more paylines, for one or more symbol combinations, each different wager amount is associated with a different predefined increment amount. In this embodiment, a first incrementor symbol combination is associated with a first predefined increment amount if a first wager amount is placed and the same first incrementor symbol combination is associated with a second, different predefined increment amount if a second, different wager amount is placed. In another embodiment wherein the gaming system enables a player to wager different amounts on one or more paylines, regardless of the different wager amount placed, one or more symbol combinations are each associated with the same respective predefined increment amount.

In another embodiment wherein the gaming system enables a player to wager on a number of ways to win, after determining if any awards are associated with any formed strings of related symbols, the gaming system determines, for each formed string of related symbols, if the formed string of related symbols is an incrementor symbol combination or a target symbol combination. If the formed string of related symbols is an incrementor symbol combination and/or a target symbol combination, the gaming system proceeds as described above with respect to any incrementor symbol combinations and any target symbol combinations.

In another embodiment, the gaming device being played by a player generates the symbol combinations associated with the dynamic awards and the central controller monitors the current values of different dynamic awards of the dynamic paytable. In this embodiment, if a current value of a dynamic award reaches or exceeds a threshold value, the central controller flags or otherwise designates the target symbol combination of that dynamic award such that the central controller (and not the gaming device) causes any subsequent generations of that target symbol combination. In one such embodiment, certain of the dynamic awards associated with certain of the target symbol combinations are local dynamic awards which can only be provided to a player at a designated gaming establishment. In this embodiment, certain of the dynamic awards associated with certain of the target symbol combinations are global dynamic awards which can be provided to a player at any gaming establishment associated with the gaming system. In these embodiments, the generation of one or more incrementor symbol combination may cause a funding of a global dynamic award and the generation of one or more different incrementor symbol combinations may cause a funding of a local dynamic award.

In another embodiment, the gaming system maintains a bonus event pool or bonus event fund. In this embodiment, one or more of the maintained dynamic paytables includes a plurality of bonus event pool contribution symbol combinations. Each bonus event pool contribution symbol combination is associated with a bonus event pool contribution amount. In one such embodiment, the bonus event pool contribution amount associated with a bonus event pool contribution symbol combination is a preset or predetermined amount. In another such embodiment, the bonus event pool contribution amount associated with a bonus event contribution symbol combination is a portion or percentage of the wager placed on the play of the primary game which generated the bonus event pool contribution symbol combination.

In operation of one embodiment, after enabling a player to place a wager to initiate a play of a game, the gaming system generates a plurality of symbols to form a symbol combination. If the gaming system determines that the formed symbol combination is one of the bonus event pool contribution symbol combinations, the gaming system increases the bonus event pool. In this embodiment, the bonus event pool is increased based on the bonus event pool contribution amount associated with the generated bonus event pool contribution symbol combination. After increasing the bonus event pool, the gaming system provides any static or preset award associated with the generated bonus event pool contribution symbol combination. For example, if a first generated symbol combination is a bonus event pool contribution symbol combination associated with a bonus event contribution amount of one credit, then in addition to providing any static or preset award associated with this first generated symbol combination, the gaming system increases the bonus event pool by one credit.

After increasing the bonus event pool by any bonus event contribution amount associated with any generated bonus event pool contribution symbol combination, the gaming system determines if a bonus event pool triggering event or condition occurred. In one such embodiment, the bonus event pool triggering event occurs when a bonus event pool triggering symbol combination is generated. If the gaming system determines that the bonus event pool triggering event or condition does not occur, the gaming system continues as described above with enabling the player to play another play of the primary game and increasing the amount in the bonus event pool upon the generation of any bonus event pool contribution symbol combinations.

On the other hand, if the gaming system determines that the bonus event pool triggering event or condition occurred, the gaming system distributes part or all of the amount currently in the bonus event pool to the awards of one or more symbol combinations of the paytable. That is, the gaming system of this embodiment temporarily increases the preset or static award associated with one or more symbol combinations. Such a distribution provides that the award for one or more symbol combinations temporarily increase in value, thus creating a frenzy environment in which players want to win these increased awards.

In one embodiment, the gaming system utilizes the bonus event pool to increase the award associated each of the symbol combinations of the paytable. In another embodiment, the gaming system utilizes the bonus event pool to temporarily increase the award associated with a plurality of the symbol combinations of the paytable. For example, the gaming system temporarily increases the award associated with a plurality of the lower-valued symbol combination of the applicable paytable.

After increasing the awards associated with one or more symbol combinations of the paytable, the gaming system continues as described above with enabling the player to play additional plays of the primary game. For these additional plays of the primary game, if the gaming system generates one of the symbol combinations associated with a temporarily increased award, the gaming system provides the player the temporarily increased award and resets the award (associated with the generated symbol combination) to the static or preset award amount.

In one embodiment, after resetting the award associated with the generated symbol combination back to the static or preset award amount, the gaming system determines if at least a designated amount remains in the bonus event pool. If at least the designated amount does not remain in the bonus event pool, then the gaming system proceeds as described above with enabling the player to play another play of the primary game and increasing the amount in the bonus event pool upon the generation of bonus event pool contribution symbol combinations. On the other hand, if at least the designated amount remains in the bonus event pool, the gaming system utilizes the bonus event pool to again temporarily increase the award associated one or more of the symbol combinations of the paytable.

In one such embodiment, when distributing the amount in the bonus event pool to one or more symbol combinations, the gaming system determines if the amount currently in the bonus event pool is at least above a threshold amount. If the gaming system determines that the amount in the bonus event pool is above the threshold amount, the gaming system distributes a preset amount to each of a plurality of symbol combinations. For example, if the threshold is one-hundred credits in the bonus event pool and the bonus event pool currently has one-hundred-fifty credits available to be distributed, then the gaming system would add fifty credits to the award associated with a first symbol combination and add fifty credits to the award associated with a second, different symbol combination.

On the other hand, if the gaming system determines that the amount in the bonus event pool is below the threshold amount, the gaming system distributes a percentage of the current bonus event pool to each of a plurality of symbol combinations. For example, if the threshold is one-hundred credits in the bonus event pool and the bonus event pool currently has fifty credits available to be distributed, then the gaming system would add 50% of the amount in the bonus event pool (in this case twenty-five credits) to the award associated with a first symbol combination and add 50% of the amount in the bonus event pool (in this case twenty-five credits) to the award associated with a second, different symbol combination. This process continues until the amount in the bonus event pool reaches a designated amount, such as zero credits. In various embodiments, the same preset amount is distributed to each of a plurality of symbol combinations and/or the same percentage of the current bonus event pool is distributed to each of a plurality of symbol combinations. In various embodiments, different preset amounts are distributed to each of a plurality of symbol combinations and/or different percentages of the current bonus event pool are distributed to each of a plurality of symbol combinations.

In one embodiment in which the bonus event pool triggering event is the generation of a bonus event pool triggering symbol combination, the bonus event pool triggering symbol combination is associated with a bonus event pool contribution amount which funds the bonus event pool. Such a configuration provides that whenever the bonus event pool triggering event occurs, there will always be a minimum amount of credits in the bonus event pool to be distributed as described herein.

In one embodiment, as an alternative to the target symbol combinations and incrementor symbol combinations described herein, the gaming system includes such bonus event pool contribution symbol combinations. In another embodiment, the gaming system includes such bonus event pool contribution symbol combinations in addition to the target symbol combinations and incrementor symbol combinations described herein. This embodiment provides a dynamic gaming system wherein: (i) certain symbol combinations (i.e., incrementor symbol combinations) cause an increase to the dynamic award associated with certain other symbol combinations (i.e., target symbol combinations) and (ii) certain symbol combinations (i.e., bonus event pool contribution symbol combinations) cause an increase to a bonus event pool which is subsequently used to increase the average expected payout percentage for one or more plays of the primary game. In such a configuration in which the incrementor symbol combinations increase the dynamic awards associated with higher valued target symbol combinations and the bonus event pool increases the awards associated with lower valued winning symbol combinations of the paytable, the gaming system disclosed herein provides a dynamic paytable wherein funds are moving up the paytable to certain higher valued symbol combinations and funds are also moving down the paytable to lower valued symbol combinations.

In another embodiment, the gaming system includes a bonus event which utilizes a community device or shared multi-outcome symbol display, such as a wheel positioned adjacent to each of a plurality of adjacently arranged gaming devices. In one such embodiment, the community display has a plurality of individual sections. Each section is associated with an award amount which is displayed on that section of the community device. In one such embodiment, the gaming devices are positioned and spaced apart about the perimeter of the community display, wherein the individual award amounts are set relative to each other.

In one embodiment utilizing the community device, one or more of the maintained dynamic paytables includes a plurality of community device contribution symbol combinations. Each community device contribution symbol combination is associated with a community device contribution amount. In one such embodiment, the community device contribution amount associated with a community device contribution symbol combination is a preset or predetermined amount. In another such embodiment, the community device contribution amount associated with a community device contribution symbol combination is a portion or percentage of the wager placed on the play of the primary game which generated the community device contribution symbol combination.

In operation of one embodiment, after enabling a player to place a wager to initiate a play of a game, the gaming system generates a plurality of symbols to form a symbol combination. In addition to providing any static or preset award associated with the generated symbol combination, the gaming system determines if the formed symbol combination is one of the community device contribution symbol combinations. If the gaming system determines that the formed symbol combination is one of the community device contribution symbol combinations, the gaming system increases the award amount associated with one or more sections of the community device. For example, if a first community device contribution symbol combination is associated with a first section of the community device and a community device contribution amount of twenty credits, and the gaming system randomly generates the first community device contribution symbol combination, the gaming system increases the displayed award of the first section of the community device by the community device contribution amount of twenty credits.

After increasing any awards associated with any sections of the community device (as a result of any generated community device contribution symbol combinations), the gaming system determines if a community device triggering event or condition occurred. In one such embodiment, the community device triggering event occurs when a community device triggering symbol combination is generated. If the gaming system determines that the community device triggering event or condition does not occur, the gaming system continues as described above with enabling the player to play another play of the primary game and increasing the award amount associated with one or more sections of the community device upon the generation of community device contribution symbol combinations.

On the other hand, if the gaming system determines that the community device triggering event or condition occurred, the gaming system activates the community device (i.e., causes a wheel to spin) and simultaneously generates a separate or individual award amount associated with each of the gaming devices determined to participate in the triggered event. That is, each gaming device indicates a separate one of the award amounts associated with a separate one of the sections of the community device. The then current value of the award amount associated with the indicated section is provided to the player of that gaming device. In one embodiment, the separate award amounts are simultaneously generated or displayed to each player of each gaming device determined to participate in the bonus event. In this embodiment, each gaming device that participates in the bonus event is provided the individual award amount associated with that gaming device. After the bonus event, the gaming system resets each award amount associated with each section of the community device to a default or reset value.

In another embodiment, the gaming system utilizes the community device and maintains a bonus event pool. As described above, certain symbol combinations are bonus event contribution symbol combinations which cause an increase in the bonus event pool when generated. In one embodiment, upon a suitable triggering condition, such as the generation of a bonus event pool/community device distribution symbol combination, the gaming system distributes part or all of the current value of the bonus event pool to increase the award amount associated with one or more sections of the community device. As described above, upon the gaming system determining that the community device triggering event or condition occurred, the gaming system activates the community device and simultaneously generates a separate or individual award amount associated with each of the gaming devices determined to participate in the bonus event. Such a distribution creates a frenzy type environment in which players want to cause the community device to activate with the increased award amounts before they are hit or won by another player and reset.

In another embodiment, any award amounts associated with any sections of the community device that are indicated by any gaming devices during the bonus event are shared amongst all active, eligible players. In one such embodiment, the award amounts are divided equally amongst the active, eligible players. In another such embodiment, the award amounts are divided based on each player's play level, with a larger share going to players who have been wagering greater amounts.

Figure 9:
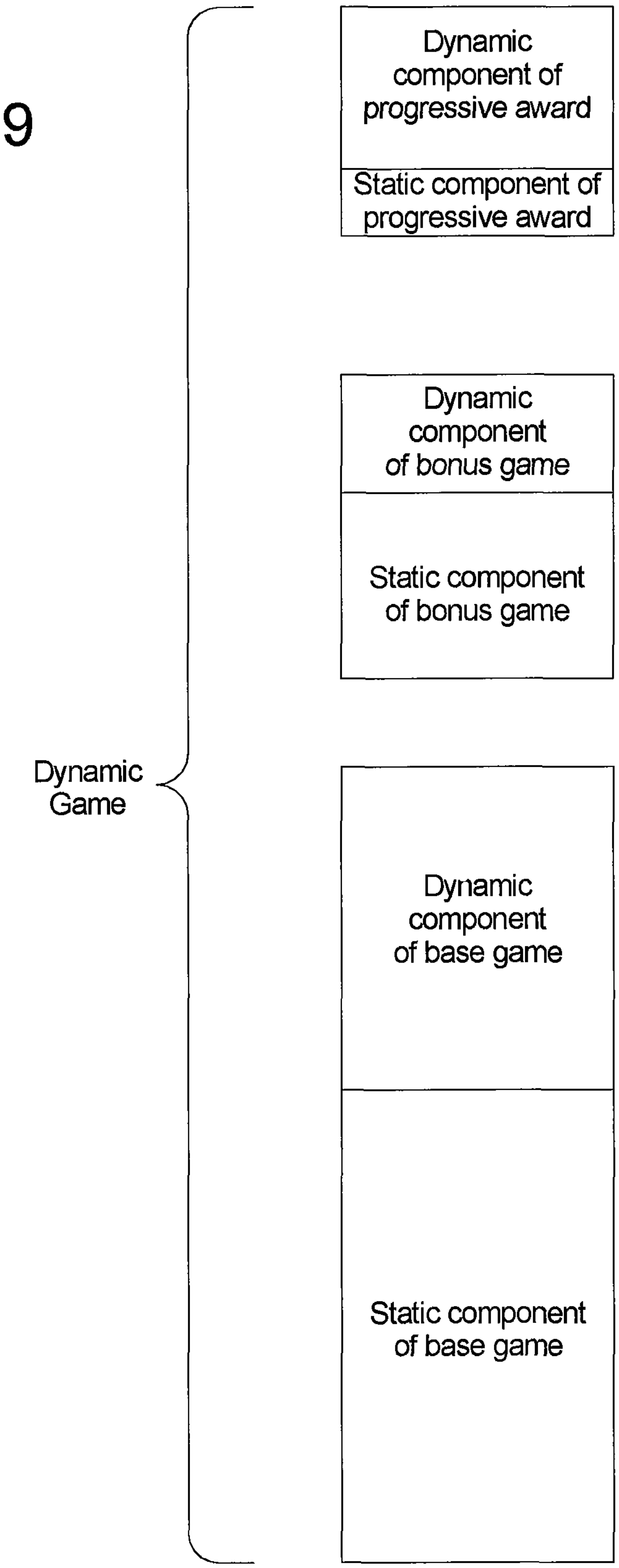
FIG. 9 is a schematic diagram illustrating a plurality of different features of one embodiment of the gaming system disclosed herein and the preset component and dynamic component of such features.

In one embodiment, in addition to or as an alternative to increasing the values of the dynamic awards of target symbol combinations (and thus altering the dynamic paytable of the base game as described herein), the gaming system shifts, redistributes or reallocates the amounts that different gaming system features contribute to the overall average expected payback percentage of the gaming system. In one such embodiment, the gaming system provides that certain features of the gaming system each have a static or preset component of the average expected payback percentage of the gaming system and such features also have a dynamic or variable component of the average expected payback percentage. In this embodiment, the gaming system is configured to shift such dynamic components amongst the different features without changing the overall average expected payback percentage of the gaming system. For example, as seen in FIG. 9, a first feature, such as a base or primary game includes a static or preset component and a dynamic component; a second feature, such as a bonus or secondary game includes a static or preset component and a dynamic component and a third feature, such as a award includes a static or preset component and a dynamic component. In different examples, the gaming system redistributes (or enables a gaming system operator, a gaming system implementer or a player to redistribute) these dynamic components amongst the different features of the gaming system. In one such example, the gaming system redistributes (or enables the gaming system operator, the gaming system implementer or the player to redistribute) part of the dynamic component of the base game to the dynamic component of the bonus game to provide a gaming system in which the bonus game provides a greater portion of the average expected payback percentage. In another such example, the gaming system redistributes (or enables the gaming system operator, the gaming system implementer or the player to redistribute) part of the dynamic components of the base game and the bonus game to the dynamic component of the award to provide a gaming system with increased volatility and the potential to trigger greater award wins. Accordingly, this embodiment provides that, without affecting the overall average expected payback percentage, the gaming system is configured to redistribute the dynamic component from one gaming system feature to another gaming system.

Accordingly, the gaming system and method disclosed herein provides dynamic awards that increment or increase based, at least in part, on one or more random events which occur in association with one or more plays of a game. Such a configuration provides that the more frequently these random events occur, the more frequently the gaming system increases the dynamic awards and the quicker such dynamic awards increase in value. Such a configuration further provides gaming designers increase flexibility an designing paytables to be implemented with the gaming system disclosed herein. That is, gaming system designers and/or gaming system implementers can provide a gaming system which targets certain configurations, such as a desired level of volatility, a desired level of winning outcome hit frequencies, increasing awards associated with certain types of wins (i.e., scatter wins) and/or increasing awards associated with symbol combinations players view as lucky.

In one embodiment, as described above, a bonus event pool triggering event occurs and/or a community device triggering event occurs based on one or more game play events, such as a symbol-driven trigger. In other embodiments, a bonus event pool triggering event occurs and/or a community device triggering event occurs based on exceeding a certain amount of game play (such as number of games, number of credits, or elapsed amount of time), or based on reaching a specified number of points earned during game play.

In another such embodiment, the gaming system determines if a bonus event pool triggering event and/or a community device triggering event occurs independent of any displayed event in any play of any base game. In another embodiment, the gaming system tracks the occurrences of one or more suitable events occurring at or in association with one or more players and/or one or more gaming devices in the gaming system and determines, based on these tracked events, whether a bonus event pool triggering event and/or a community device triggering event has occurred. In another embodiment, the gaming system defines one or more game play parameters, wherein each time a player's tracked game play activity satisfies the defined parameter, the bonus event pool triggering event and/or the community device triggering event occurs.

In another such embodiment, a bonus event pool triggering event and/or a community device triggering event occurs based on a random trigger or on an apparently random trigger. In one such embodiment, the gaming system does not provide any apparent reasons to the player for the occurrence of the bonus event pool triggering event and/or the community device triggering event, wherein such events are not based on any event in any of the plays of any primary games or on any of the plays of any secondary game of the gaming system. That is, the bonus event pool triggering event and/or the community device triggering event occurs without any explanation or alternatively with simple explanations. In another embodiment, bonus event pool triggering event and/or the community device triggering event occurs at least partially based on a game event, such as a symbol-driven trigger, and at least partially based on a non-game play event, such as a random event.

In one such embodiment, the occurrence of the bonus event pool triggering event and/or the community device triggering event is randomly determined, wherein different players are assigned different chances of triggering the bonus game based on their respective wager levels. In another embodiment, the occurrence of a bonus event pool triggering event and/or the community device triggering event is randomly determined, wherein different games played (or gaming devices played) are assigned different chances triggering such an event. In another embodiment, the occurrence of triggering a bonus game is randomly determined, wherein different denomination gaming devices are assigned different chances of triggering such an event.

In one such embodiment, the bonus event pool triggering event and/or the community device triggering event occurs based on at least one accumulated value pool incremented to a pool hit value. In this embodiment, the gaming system includes one or more accumulated value pools or Nth coin pools. Such accumulated value pools are driven by an amount of wagers placed or a suitable coin-in amount. In one such embodiment, each accumulated value pool is associated with a range of values, wherein a bonus event pool triggering event occurs when the pool increments to a pool hit value within the range of values associated with that pool. That is, when an accumulated value pool increases to a determined pool hit value, a bonus event pool triggering event and/or a community device triggering event occurs. In this embodiment, after the accumulated value pool causes a bonus event pool triggering event occurs, the accumulated value pool is reset to a default value and starts incrementing from the default pool level.

In another such embodiment, a bonus event pool triggering event and/or the community device triggering event occurs based on time. In this embodiment, a time is set for when a bonus event pool triggering event occurs will occur. In one embodiment, such a set time is based on historic data. In one such embodiment, if previous bonus event pool triggering events and/or community device triggering events have occurred after approximately thirty-seven minutes, a bonus event pool triggering event and/or a community device triggering event is set to trigger thirty-seven minutes from the conclusion of the previous event. In one embodiment, a suitable algorithm is implemented to determine the player who wagered at or closest to this time with tie-breaking based on any number of factors (e.g., player tracking history, amount of or recent wagers placed).

In another such embodiment, a bonus event pool triggering event and/or the community device triggering event occurs based on a predefined variable reaching a defined parameter threshold. In different embodiments, the predefined parameter thresholds include a length of time, a length of time after a certain dollar amount is hit, a wager level threshold for the gaming system (which gaming device is the first to contribute $250,000), a number of gaming machines in the gaming system active, or any other parameter that would define a threshold for the occurrence a bonus event pool triggering event and/or the community device triggering event.

In another such embodiment, a bonus event pool triggering event and/or the community device triggering event occurs after a random number of plays in which a bonus event pool triggering event and/or the community device triggering event has not occurred. In another alternative embodiment, the gaming system determines if a bonus event pool triggering event and/or a community device triggering event occurs based upon gaming system operator defined player eligibility parameters stored on a player tracking system (such as via a player tracking card or other suitable manner). For example, a gaming system operator may choose to only enable players of the highest player tracking status to be eligible for a bonus event pool triggering event. In this embodiment, the parameters for eligibility are defined by the gaming system operator based on any suitable criterion. In one embodiment, the central controller/gaming device processor recognizes the player's identification (via the player tracking system) when the player enters their player tracking card in the gaming machine. The gaming system/gaming device processor determines the player tracking level of the player and if the current player tracking level defined by the gaming system operator is eligible for a bonus event pool triggering event and/or a community device triggering event. In one embodiment, the gaming system operator defines minimum bet levels required for a bonus event pool triggering event and/or a community device triggering event based on the player's card level. In this embodiment, different bet amounts are required to be eligible for different bonus event pool triggering events and/or different community device triggering events. In another embodiment, as described above, different side bets or side-wager amounts are required to be eligible for different bonus event pool triggering events and/or different community device triggering events. Once the central controller/gaming device processor determines which players are eligible, any suitable method for determining if a bonus event pool triggering event and/or the community device triggering event occurs may be employed.

In another such embodiment, the occurrence of a bonus event pool triggering event and/or a community device triggering event includes a system determination which is based on a random selection by the central controller. In one embodiment, the central controller tracks all active gaming systems and the wagers they placed. Each gaming system has its own entry defining its state as either active or inactive and also defining the values of the wagers from that gaming system. In one embodiment, active status means that the gaming system is being actively played by a player and enrolled/inactive status means that the gaming system is not being actively played by a player. The active status requirements can be based on any suitable number of satisfied criteria or defined in any suitable manner by the implementer of the gaming system. In one embodiment, a play of or wager on the primary game of the gaming system within a predetermined period of time is part of the determination of whether that gaming system is in the active status. Other factors such as: (a) the amount of time between each play of or wager on the primary game of the gaming system; (b) the amount being wagered on the primary game(s); and (c) the number of plays within a period of time, may also or alternatively be part of the determination of whether a gaming system is in the active status; (d) the existence of credits on the gaming system may also or alternatively be part of the determination of whether a gaming system is in the active status.

In one such embodiment, based on the gaming machine's state as well as one or more wager pools associated with the gaming machine, the central controller determines if a bonus event pool triggering event and/or a community device triggering event occurs for one or more gaming devices. In one embodiment, a bonus event pool triggering event and/or a community device triggering event occurs for the gaming machine which has been classified as active the longest since the last triggering event. In another embodiment, a bonus event pool triggering event and/or a community device triggering event occurs based on the relative proportion of gaming/wagering activity at each gaming device in the gaming system. In this embodiment, a bonus event pool triggering event and/or a community device triggering event is more likely to occur for the player who consistently places a higher wager than a player who consistently places a minimum wager.

In another embodiment, the central controller determines, in cooperation with the gaming system, when to cause a bonus event pool triggering event and/or a community device triggering event to occur by utilizing one or more random number generators. In this embodiment, the central controller determines when to cause the bonus event pool triggering event and/or the community device triggering event to occur by determining if any numbers allotted to a gaming system match a randomly selected number. In one such embodiment, upon or prior to each play of the game, a random number is selected from a range of numbers and during each primary game, the gaming system allocates the first N numbers in the range, where N is the number of credits bet by the player in that primary game. At the end of the primary game, the randomly selected number is compared with the numbers allocated to the player and if a match occurs, the gaming system causes a bonus event pool triggering event and/or the community device triggering event to occur. It should be appreciated that any suitable manner of causing a bonus event pool triggering event to occur may be implemented with the gaming system disclosed herein.

In one embodiment, the central controller and an individual gaming machine work in conjunction with each other to determine when a bonus event pool triggering event and/or a community device triggering event occurs, for example through an individual gaming machine meeting a predetermined requirement or criteria established by the central controller. In another embodiment, an individual gaming machine may determine when one or more bonus event pool triggering events and/or community device triggering events occur. In another embodiment, an individual gaming machine may determine when at least one bonus event pool triggering event and/or community device triggering event occurs and the central controller determines when at least one bonus event pool triggering event and/or community device triggering event occurs. It should be appreciated that any suitable determination of how and when one or more bonus event pool triggering events and/or community device triggering events occur may be implemented in accordance with the gaming system disclosed herein.

Progressive Awards

In another embodiment, in addition to the dynamic awards described above, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

a housing;

a plurality of input devices supported by the housing, said plurality of input devices including:

(i) an acceptor, and (ii) a cashout device, at least one display device supported by the housing, at least one processor, and at least one memory device which stores a plurality of instructions, which when executed by the at least one processor, cause the at least one processor to operate with the plurality of input devices and the at least one display device to:

(a) when a physical item is received via the acceptor, establish a credit balance based, at least in part, on a monetary value associated with the received physical item;

(b) for each play of a wagering game:

(i) randomly generate a plurality of symbols to form one of a plurality of different symbol combinations, said plurality of symbol combinations including a plurality of different incrementor symbol combinations and a separate plurality of different target symbol combinations, each different incrementor symbol combination having a predetermined association with at least one of the different target symbol combinations and a predefined increment amount and at least a designated one of the plurality of symbol combinations being one of the plurality of incrementor symbol combinations and one of the plurality of target symbol combinations;

(ii) display the formed symbol combination;

(iii) when the formed symbol combination is one of the plurality of incrementor symbol combinations:

(A) for each different target symbol combination associated with the formed incrementor symbol combination, increase a current value of a dynamic award of said target symbol combination, said increase based on at least part of the predefined increment amount of the formed incrementor symbol combination, and (B) provide any award associated with the formed incrementor symbol combination, wherein the credit balance is increasable based on any provided award associated with the formed incrementor symbol combination;

(iv) when the formed symbol combination is one of the plurality of target symbol combinations:

(A) provide the current value of the dynamic award of said formed target symbol combination, wherein the credit balance is increasable based on the provided current value of the dynamic award of said formed target symbol combination, and (B) reset the current value of the dynamic award of said formed target symbol combination to a reset value;

(v) when the formed symbol combination is said designated one of the plurality of symbol combinations:

(A) for each different target symbol combination associated with the formed designated one of the symbol combinations, increase a current value of a dynamic award of said target symbol combination, (B) provide the current value of the dynamic award of said formed designated one of the symbol combinations, wherein the credit balance is increasable based on the provided current value of the dynamic award of said formed designated one of the symbol combinations, and (C) reset the current value of the dynamic award of said formed designated one of the symbol combinations; and (c) if a cashout input is received via the cashout device, cause an initiation of any payout associated with the credit balance.

2. The gaming system of claim 1, wherein said reset value is based on a value of a dynamic award reset value pool.

3. The gaming system of claim 2, wherein said dynamic award reset value pool is funded based on at least part of the predefined increment amount of each formed incrementor symbol combination.

4. The gaming system of claim 2, wherein when executed by the at least one processor when a first one of the incrementor symbol combinations is formed, the plurality of instructions cause the at least one processor to, for each target symbol combination associated with the formed incrementor symbol combination, increase a current value of the dynamic award reset value pool based on at least part of the predefined increment amount of the formed incrementor symbol combination.

5. The gaming system of claim 4, wherein when executed by the at least one processor when a first one of the target symbol combinations is formed, the plurality of instructions cause the at least one processor to reset a current value of the dynamic award of said formed target symbol combination to a reset value, said reset value based on the current value of the dynamic award reset value pool.

6. The gaming system of claim 5, wherein the reset value is based on the current value of the dynamic award reset value pool and at least one predefined criteria.

7. The gaming system of claim 5, wherein when executed by the at least one processor, the plurality of instructions cause the at least one processor to reset the dynamic award reset value pool when a predetermined one of the plurality of symbol combinations is generated.

8. The gaming system of claim 5, wherein when executed by the at least one processor, the plurality of instructions cause the at least one processor to cause the dynamic award reset value pool to have a negative value.

9. The gaming system of claim 1, wherein a plurality of the incrementor symbol combinations are each associated with one of the target symbol combinations.

10. The gaming system of claim 1, wherein at least one of the incrementor symbol combinations is associated with a plurality of the target symbol combinations.

11. A gaming system comprising:

a controller configured to maintain a paytable including a plurality of symbol combinations, said plurality of symbol combinations including a plurality of incrementor symbol combinations and a separate plurality of target symbol combinations, each incrementor symbol combination having a predetermined association with at least one of the target symbol combinations and a predefined increment amount and at least one of the plurality of symbol combinations is one of the plurality of incrementor symbol combinations and one of the plurality of target symbol combinations;

a first gaming device including:

a plurality of first gaming device input devices including a first gaming device acceptor and a first gaming device cashout device, and at least one first memory device which stores a plurality of instructions, which when executed by at least one first processor, cause the at least one first processor to operate with the controller, the plurality of first gaming device input devices and at least one first display device to:

(a) when a physical item is received via the first gaming device acceptor, establish a first flaming device credit balance based, at least in part, on a monetary value associated with the received physical item, (b) enable a first player to place, via an actuation of a first wager button, a wager to play a first game at a first point in time, wherein said first gaming device credit balance is decreasable based on the wager placed to play the first game, (c) for the play of the first game, generate and display a plurality of symbols to form one of the plurality of symbol combinations, (d) when the formed symbol combination is a first one of the plurality of incrementor symbol combinations, increase a current value of a dynamic award of each target symbol combination associated with said formed incrementor symbol combination, each increase based on at least part of the predefined increment amount of said formed incrementor symbol combination, and (e) if a cashout input is received via the first gaming device cashout device, cause an initiation of any payout associated with the first gaming device credit balance displayed by the at least one first display device; and a second gaming device including:

a plurality of second gaming device input devices including a second gaming device acceptor and a second gaming device cashout device, and at least one second memory device which stores a plurality of instructions, which when executed by at least one second processor, cause the at least one second processor to operate with the controller, the plurality of second gaming device input devices and at least one second display device to:

(a) when a physical item is received via the second gaming device acceptor, establish a second gaming device credit balance based, at least in part, on a monetary value associated with the received physical item;

(b) enable a second, different player to place, via an actuation of a second wager button, a wager to play a second game at a second, subsequent point in time, wherein said second gaming device credit balance is decreasable based on the wager placed to play the second game, (c) for the play of the second, different game, generate and display a plurality of symbols to form one of the plurality of symbol combinations, (d) when the formed symbol combination is one of the target symbol combinations associated with the first one of the plurality of incrementor symbol combinations:

(i) provide the current value of the dynamic award of said formed target symbol combination to the second player, wherein the second gaming device credit balance is increasable based on the provided current value of the dynamic award of said formed target symbol combination, and (ii) reset the current value of the dynamic award of said formed target symbol combination to a reset value, and (e) if a cashout input is received via the second gaming device cashout device, cause an initiation of any payout associated with the second gaming device credit balance displayed by the at least one second display device.

12. The gaming system of claim 11, wherein said reset value is based on a value of a dynamic award reset value pool.

13. The gaming system of claim 12, wherein said dynamic award reset value pool is funded based on at least part of the predefined increment amount of each formed incrementor symbol combination.

14. The gaming system of claim 11, wherein a plurality of the incrementor symbol combinations are each associated with one of the target symbol combinations.

15. The gaming system of claim 11, wherein at least one of the incrementor symbol combinations is associated with a plurality of the target symbol combinations.

16. The gaming system of claim 11, wherein the first gaming device and the second gaming device are located remote from each other and at least one of the plurality of symbol combinations is associated with said first gaming device and said second gaming device located at said remote locations.

17. A gaming system comprising:

a plurality of gaming devices, each gaming device including:

a housing, a plurality of input devices supported by the housing, said plurality of input devices including:

an acceptor, and a cashout device, and at least one memory device which stores a plurality of instructions, which when executed by at least one processor, cause the at least one processor to operate with the plurality of input devices and at least one display device to:

(a) when a physical item is received via the acceptor, establish a credit balance based, at least in part, on a monetary value associated with the received physical item;

(b) if a cashout input is received via the cashout device, cause an initiation of any payout associated with the credit balance; and a controller configured to operate with the plurality of gaming devices, said controller and said gaming devices programmed to:

(a) when a first player at a first one of the gaming devices causes a play of a first game during a first period of time:

(i) generate and display a plurality of symbols to form one of a plurality of different symbol combinations, and (ii) when the formed symbol combination is a first symbol combination:

(A) provide at least a first part of a value of an award of said first symbol combination to the first player, and (B) store at least a second part of the value of the award of said first symbol combination;

(b) when the first player at the first one of the gaming devices causes a play of the game during a second, subsequent period of time:

(i) generate and display a plurality of symbols to form one of the plurality of symbol combinations, and (ii) when the formed symbol combination is a second, different symbol combination, provide at least the stored second part of the value of the award of said first symbol combination to the first player; and (c) when a second, different player at a second, different one of the gaming devices causes a play of the game during the second, subsequent period of time:

(i) generate and display a plurality of symbols to form one of the plurality of symbol combinations, and (ii) when the formed symbol combination is the second, different symbol combination, provide at least the stored second part of the value of the award of said first symbol combination to the second player.

18. The gaming system of claim 17, wherein at least two of the plurality of gaming devices are located remote from each other and at least one of the plurality of symbol combinations is associated with said at least two gaming devices at each of said remote locations.

19. A gaming system comprising:

a housing, a plurality of input devices supported by the housing, said plurality of input devices including:

(i) an acceptor, and (ii) a cashout device, at least one display device supported by the housing, at least one processor, and at least one memory device which stores a plurality of instructions, which when executed by the at least one processor, cause the at least one processor to operate with the plurality of input devices and the at least one display device to:

(a) when a physical item is received via the acceptor, establish a credit balance based, at least in part, on a monetary value associated with the received physical item;

(b) enable a player to place a wager for a play of a game, wherein said credit balance is decreasable based on the wager placed to play the game;

(c) randomly generate a plurality of symbols to form one of a plurality of different symbol combinations, said plurality of symbol combinations including a plurality of different bonus event pool contribution symbol combinations, each different bonus event pool contribution symbol combination associated with a bonus event pool contribution amount, wherein at least two different bonus event pool contribution symbol combinations are associated with at least two different bonus event pool contribution amounts;

(d) display the formed symbol combination;

(e) provide a current value of any award associated with the formed symbol combination, wherein the credit balance is increasable based on the provided current value of any award associated with the formed symbol combination;

(f) when the formed symbol combination is one of the plurality of different bonus event pool contribution symbol combinations, increase a current value of a maintained bonus event pool, said increase based on at least part of the bonus event pool contribution amount of the formed bonus event pool contribution symbol combination;

(g) when a bonus event pool triggering condition occurs, for each of a plurality of said different symbol combinations, increase the current value of an award associated with said symbol combination, said increase based, at least in part, on the current value of the maintained bonus event pool; and (h) if a cashout input is received via the cashout device, cause an initiation of any payout associated with the credit balance.

20. The gaming system of claim 19, wherein said plurality of symbol combinations including a plurality of different incrementor symbol combinations and a plurality of different target symbol combinations, each different incrementor symbol combination associated with at least one of the different target symbol combinations and a predefined increment amount.

21. The gaming system of claim 20, wherein when executed by the at least one processor when the formed symbol combination is one of the plurality of incrementor symbol combinations, the plurality of instructions cause the at least one processor to, for each target symbol combination associated with the formed incrementor symbol combination, increase a current value of a dynamic award of said target symbol combination, said increase based on at least part of the predefined increment amount of the formed incrementor symbol combination.

* * * * *